(12) United States Patent
Mizuno

(10) Patent No.: US 12,425,522 B2
(45) Date of Patent: Sep. 23, 2025

(54) AUTHENTICITY COLLATION SYSTEM AND AUTHENTICITY COLLATION METHOD

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 18/346,768

(22) Filed: Jul. 3, 2023

(65) Prior Publication Data

US 2023/0351779 A1 Nov. 2, 2023

Related U.S. Application Data

(63) Continuation of application No. PCT/JP2022/001195, filed on Jan. 14, 2022.

(30) Foreign Application Priority Data

Jan. 14, 2021 (JP) ................. 2021-004326

(51) Int. Cl.
*G06V 20/00* (2022.01)
*G06T 5/00* (2024.01)
(Continued)

(52) U.S. Cl.
CPC ............... *G06V 20/95* (2022.01); *G06T 5/00* (2013.01); *G06T 5/50* (2013.01); *G06T 7/11* (2017.01);
(Continued)

(58) Field of Classification Search
CPC ........ G06V 20/95; G06V 10/759; G06T 5/50; G06T 5/00; G06T 7/11; G06T 7/30;
(Continued)

(56) References Cited

U.S. PATENT DOCUMENTS

2001/0054149 A1 12/2001 Kawaguchi et al.
2002/0015514 A1* 2/2002 Kinjo ................... G06V 40/175
382/162

(Continued)

FOREIGN PATENT DOCUMENTS

JP 2002007977 1/2002
JP 2004102562 4/2004
(Continued)

OTHER PUBLICATIONS

"International Search Report (Form PCT/ISA/210) of PCT/JP2022/001195", mailed on Apr. 5, 2022, with English translation thereof, pp. 1-5.

(Continued)

*Primary Examiner* — Nicholas Pachol
(74) *Attorney, Agent, or Firm* — JCIPRNET

(57) ABSTRACT

An issuing apparatus is configured to acquire an image obtained by capturing a collation image printed on an information medium via a camera as a first captured image. A collation apparatus is configured to acquire an image obtained by capturing a collation image printed on an information medium to be collated via a camera as a second captured image, generate a corrected image obtained by performing density correction on the first captured image, by predicting a density change at a time point at which the second captured image is acquired based on an elapsed time from a time point at which the first captured image is acquired, and determine a collation region for collation between the first captured image and the second captured image based on a difference image obtained by obtaining a difference between the second captured image and the corrected image for each pixel.

12 Claims, 28 Drawing Sheets

(51) Int. Cl.
  *G06T 5/50*     (2006.01)
  *G06T 7/11*     (2017.01)
  *G06T 7/30*     (2017.01)
  *G06V 10/75*    (2022.01)
  *H04N 1/32*     (2006.01)
  *H04N 1/407*    (2006.01)

(52) U.S. Cl.
  CPC .............. *G06T 7/30* (2017.01); *G06V 10/759* (2022.01); *H04N 1/32133* (2013.01); *H04N 1/407* (2013.01); *G06T 2207/20021* (2013.01); *H04N 2201/3233* (2013.01); *H04N 2201/3269* (2013.01); *H04N 2201/3276* (2013.01)

(58) Field of Classification Search
  CPC ...... G06T 2207/20021; H04N 1/32133; H04N 1/407; H04N 1/00838; H04N 2201/3233; H04N 2201/3269; H04N 2201/3276
  See application file for complete search history.

(56) References Cited

U.S. PATENT DOCUMENTS

| | | | | |
|---|---|---|---|---|
| 2002/0129255 | A1* | 9/2002 | Tsuchiyama | G06T 1/0021 713/176 |
| 2004/0109614 | A1* | 6/2004 | Enomoto | H04N 1/622 382/275 |
| 2004/0153649 | A1* | 8/2004 | Rhoads | G07D 7/0034 707/E17.112 |
| 2014/0294230 | A1 | 10/2014 | Nakano et al. | |
| 2015/0365543 | A1* | 12/2015 | Iwata | H04N 1/00952 358/1.13 |
| 2017/0070501 | A1 | 3/2017 | Saito et al. | |
| 2018/0189590 | A1 | 7/2018 | Fuchigami et al. | |
| 2020/0219234 | A1* | 7/2020 | Sotodate | H04N 7/183 |
| 2021/0248338 | A1* | 8/2021 | Spivack | G06K 7/10831 |
| 2023/0274576 | A1* | 8/2023 | Mizuno | G06T 7/90 382/118 |

FOREIGN PATENT DOCUMENTS

| | | |
|---|---|---|
| JP | 2014204165 | 10/2014 |
| JP | 2017013399 | 1/2017 |
| WO | 2015136938 | 9/2015 |
| WO | 2017010058 | 1/2017 |

OTHER PUBLICATIONS

"Written Opinion of the International Searching Authority (Form PCT/ISA/237) of PCT/JP2022/001195", mailed on Apr. 5, 2022, with English translation thereof, pp. 1-6.

* cited by examiner

FIG. 5
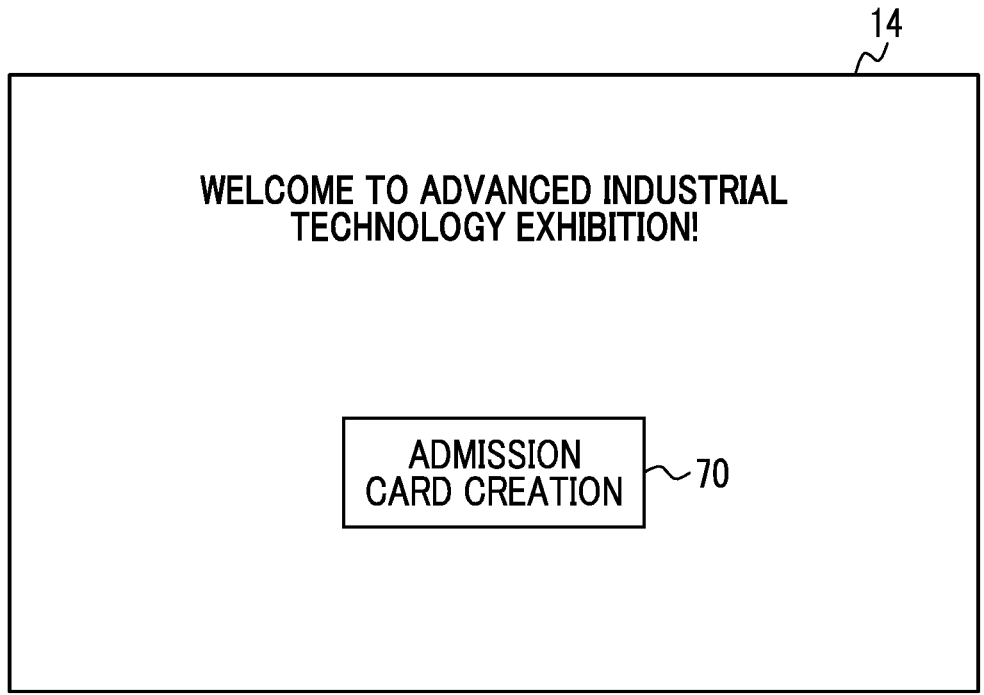
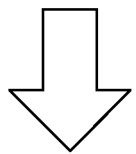
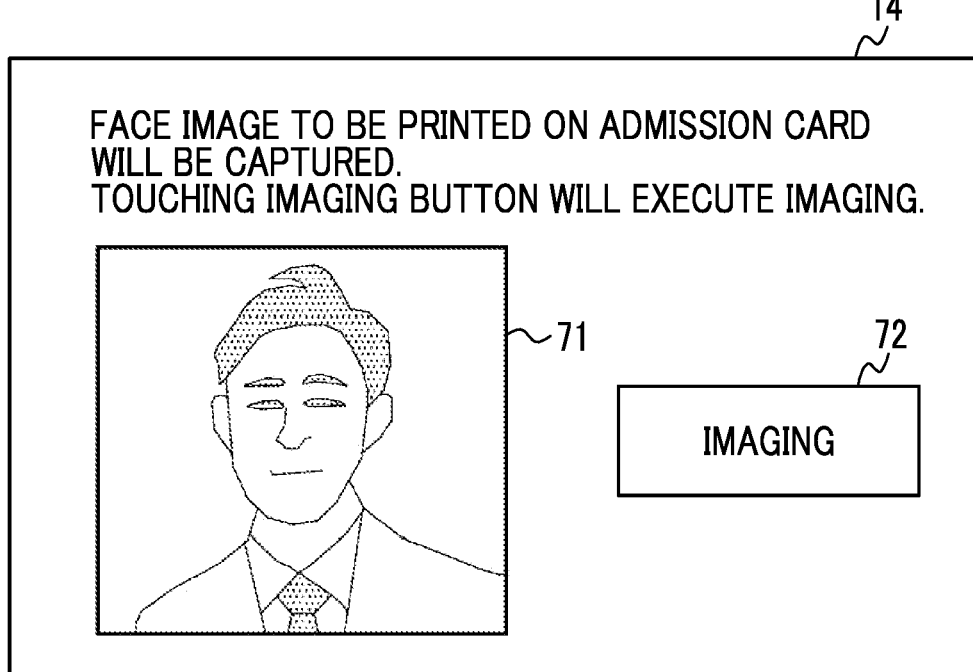

AUTHENTICITY COLLATION SYSTEM AND AUTHENTICITY COLLATION METHOD

CROSS-REFERENCE TO RELATED APPLICATION

This application is a continuation application of International Application No. PCT/JP2022/001195, filed Jan. 14, 2022, the disclosure of which is incorporated herein by reference in its entirety. Further, this application claims priority from Japanese Patent Application No. 2021-004326 filed on Jan. 14, 2021, the disclosure of which is incorporated herein by reference in its entirety.

BACKGROUND

1. Technical Field

The disclosed technology relates to an authenticity collation system and an authenticity collation method.

2. Description of the Related Art

JP2002-007977A discloses an authentication system for authenticating validity of an identification (ID) card such as an employee card or a student card. In order to perform high-security robust authentication, this authentication system uses an ID card in which an integrated circuit (IC) memory is embedded. Thus, issuing the ID card requires time and a high cost.

Not all ID cards are used for a long period, unlike the employee card, the student card, or the like. Some ID cards such as a visitor card used in an event such as an exhibition are expected to be temporarily used for a short period. As such ID cards expected to be temporarily used, a simple information medium obtained by printing an image, identification information, and the like of a user on a substrate such as paper is used.

However, since such a simple information medium can be relatively simply forged, authenticity is to be addressed. In order to prevent forgery of such an information medium, for example, JP2017-013399A suggests printing a microtext having a very small size on a substrate. In addition, JP2004-102562A suggests performing collation using a random pattern created by fibers of paper in order to collate authenticity (that is, originality) of a paper medium as a substrate.

SUMMARY

As disclosed in JP2017-013399A and JP2004-102562A, in order to collate the authenticity of the information medium, it is required to image a collation region on the information medium and perform collation as to whether or not information included in a captured image obtained by imaging matches information registered in advance.

However, for example, the above simple information medium after being issued may be stained or scratched on a surface while being carried by the user. In a case where, for example, the collation region on the information medium is stained or scratched, collation accuracy is decreased. Therefore, an authenticity collation system that uses a simple information medium and that has high collation accuracy is desired.

An object of the disclosed technology is to provide an authenticity collation system and an authenticity collation method that use a simple information medium and that have high collation accuracy.

An authenticity collation system according to an aspect of the present disclosure is an authenticity collation system comprising an issuing apparatus that issues an information medium by printing a collation image on a substrate based on collation image data, and a collation apparatus that collates authenticity of the information medium based on the collation image, in which the issuing apparatus includes a first processor, the first processor is configured to acquire an image obtained by capturing the collation image printed on the information medium via a camera as a first captured image, the collation apparatus includes a second processor, and the second processor is configured to acquire an image obtained by capturing a collation image printed on an information medium to be collated via a camera as a second captured image, generate a corrected image obtained by performing density correction on the first captured image, by predicting a density change at a time point at which the second captured image is acquired based on an elapsed time from a time point at which the first captured image is acquired, and determine a collation region for collation between the first captured image and the second captured image based on a difference image obtained by obtaining a difference between the second captured image and the corrected image for each pixel.

It is preferable that the first processor is configured to register the first captured image in a storage device, and the second processor is configured to acquire the first captured image registered in the storage device, and the second processor is configured to perform the density correction based on an elapsed time from a time point at which the first captured image is registered in the storage device.

It is preferable that the second processor is configured to determine a region in which an absolute value of a pixel value of the difference image is less than or equal to a threshold value as the collation region.

It is preferable that the second processor is configured to perform the density correction based on a table representing a relationship between the elapsed time and the density change.

It is preferable that the second processor is configured to collate the authenticity of the information medium by comparing information included in the collation region between the first captured image and the second captured image.

It is preferable that the information is a spatial frequency characteristic.

An authenticity collation method according to another aspect of the present disclosure is an authenticity collation method using an issuing apparatus that issues an information medium by printing a collation image on a substrate based on collation image data, and a collation apparatus that collates authenticity of the information medium based on the collation image, the authenticity collation method comprising causing the issuing apparatus to execute a first captured image acquisition step of acquiring an image obtained by capturing the collation image printed on the information medium via a camera as a first captured image, and causing the collation apparatus to execute a second captured image acquisition step of acquiring an image obtained by capturing a collation image printed on an information medium to be collated via a camera as a second captured image, a density correction step of generating a corrected image obtained by performing density correction on the first captured image, by predicting a density change at a time point at which the second captured image is acquired based on an elapsed time from a time point at which the first captured image is acquired, and a collation region determination step of determining a collation region for collation between the first captured image and the second captured image based on a difference image obtained by obtaining a difference between the second captured image and the corrected image for each pixel.

An authenticity collation system according to still another aspect of the present disclosure is an authenticity collation system comprising an issuing apparatus that issues an information medium by printing a collation image on a substrate based on collation image data, and a collation apparatus that collates authenticity of the information medium based on the collation image, in which the issuing apparatus includes a first processor, the first processor is configured to acquire an image obtained by capturing the collation image printed on the information medium via a camera as a first captured image, the collation apparatus includes a second processor, and the second processor is configured to acquire an image obtained by capturing a collation image printed on an information medium to be collated via a camera as a second captured image, and determine a collation region for collation between the first captured image and the second captured image based on a divided image obtained by performing division between the second captured image and the collation image data for each pixel.

It is preferable that the second processor is configured to determine a region in which a pixel value of the divided image is less than or equal to a threshold value as the collation region.

It is preferable that the second processor is configured to collate the authenticity of the information medium by comparing information included in the collation region between the first captured image and the second captured image.

It is preferable that the information is a spatial frequency characteristic.

An authenticity collation method according to still another aspect of the present disclosure is an authenticity collation method using an issuing apparatus that issues an information medium by printing a collation image on a substrate based on collation image data, and a collation apparatus that collates authenticity of the information medium based on the collation image, the authenticity collation method comprising causing the issuing apparatus to execute a first captured image acquisition step of acquiring an image obtained by capturing the collation image printed on the information medium via a camera as a first captured image, and causing the collation apparatus to execute a second captured image acquisition step of acquiring an image obtained by capturing a collation image printed on an information medium to be collated via a camera as a second captured image, and a collation region determination step of determining a collation region for collation between the first captured image and the second captured image based on a divided image obtained by performing division between the second captured image and the collation image data for each pixel.

According to the disclosed technology, it is possible to provide an authenticity collation system and an authenticity collation method that use a simple information medium and that have high collation accuracy.

BRIEF DESCRIPTION OF THE DRAWINGS

Exemplary embodiments according to the technique of the present disclosure will be described in detail based on the following figures, wherein:

FIG. 5 is a diagram illustrating an example of reception processing.

DETAILED DESCRIPTION

First Embodiment

Figure 1:
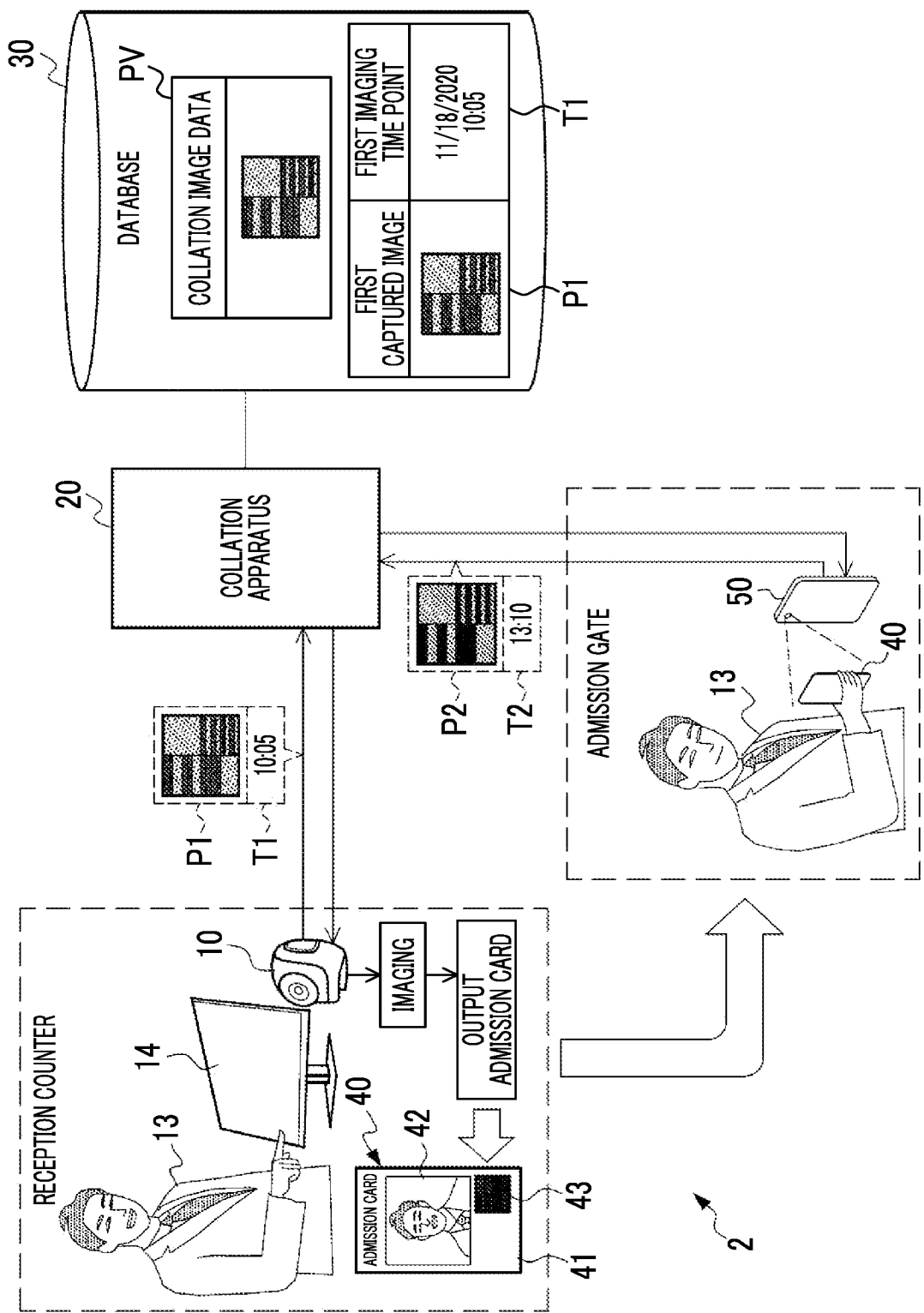
FIG. 1 is a diagram illustrating an example of an authenticity collation system according to a first embodiment.

FIG. 1 illustrates an example of an authenticity collation system 2 according to a first embodiment of the disclosed technology. As illustrated in FIG. 1, the authenticity collation system 2 comprises an issuing apparatus 10 and a collation apparatus 20. The collation apparatus 20 is connected to a database 30 for registering various types of data. For example, the issuing apparatus 10 is installed at a reception counter in an event venue and issues an admission permission card (hereinafter, referred to as the admission card) 40. For example, the issuing apparatus 10 is a digital camera including a printer. For example, the issuing apparatus 10 issues the admission card 40 by printing information on an instant film 41. The admission card 40 is an example of an "information medium" according to an embodiment of the disclosed technology.

An operation display device 14 operated by a participant 13 participating in an event is connected to the issuing apparatus 10. For example, the operation display device 14 is a display device including a touch panel. For example, the operation display device 14 guides the participant 13 who has visited the reception counter through a method of issuing the admission card 40 using a video. The operation display device 14 may be a personal computer, a tablet terminal, or the like.

For example, the admission card 40 is an ID card with which an organizer of the event collates the participant 13 at an admission gate of the event venue and permits entrance of a valid participant 13. The admission card 40 is issued to each of a plurality of participants 13 who want to enter the event venue. A face image 42 of the participant 13 captured by the issuing apparatus 10 and a collation image 43 are printed on the admission card 40. The collation image 43 is a pattern image for collating whether or not the admission card 40 to be collated is not forged and is validly issued by the issuing apparatus 10, that is, authenticity of the admission card 40.

The issuing apparatus 10 has a camera function of imaging a face of the participant 13 and a printing function of printing the face image 42 including the imaged face. For example, the issuing apparatus 10 is an instant camera having a printing function of being able to immediately print a captured image. At reception in a case where the participant 13 enters the event venue, the issuing apparatus 10 uses the printing function to instantly issue the admission card 40 on which information including the face image 42 of the participant 13 and the collation image 43 is printed. In addition, in the present example, the issuing apparatus 10 has a control function of controlling the operation display device 14 and a communication function with the collation apparatus 20 and functions as a reception apparatus that receives entrance of the participant 13 to the event venue.

The issuing apparatus 10 prints information including the face image 42 of the participant 13 and the collation image 43 on the instant film 41 as a substrate (that is, a recording medium) and outputs the instant film 41 on which information is printed as the admission card 40. For example, the collation image 43 is a pattern image having a plurality of regions of different densities. For example, collation image data PV that is digital data for printing the collation image 43 is stored in the database 30. The issuing apparatus 10 prints the collation image 43 on the instant film 41 based on the collation image data PV acquired from the database 30 through the collation image 43. For example, the collation image data PV is color image data, and the collation image 43 is printed in color on the instant film 41.

In addition, the issuing apparatus 10 acquires a first captured image P1 by capturing the collation image 43 immediately after printing information including the face image 42 and the collation image 43 on the instant film 41.

A time point (hereinafter, referred to as a first imaging time point) T1 at which the collation image 43 is captured is added to the first captured image P1. The issuing apparatus 10 transmits the first captured image P1 to the collation apparatus 20. In a case where the first captured image P1 is received from the issuing apparatus 10, the collation apparatus 20 registers the first captured image P1 in the database 30. For example, the first captured image P1 is registered in the database 30 in association with identification information for identifying the admission card 40 issued by the issuing apparatus 10.

For example, the database 30 is a storage device including a data storage device such as a hard disk drive (HDD) or a solid state drive (SSD) and a control circuit. The database 30 stores data in response to a storage request from the collation apparatus 20 and searches for data in response to a search request from the collation apparatus 20 and responds to the collation apparatus 20 with a search result. The database 30 may be provided inside the collation apparatus 20 or may be provided outside the collation apparatus 20. In a case where the database 30 is provided outside the collation apparatus 20, the database 30 and the collation apparatus 20 are communicably connected through a network such as a local area network (LAN).

For example, the participant 13 heads toward the admission gate of the event venue with the admission card 40 issued by the issuing apparatus 10 and presents the admission card 40 to staff (not illustrated) who manages the admission gate. The staff carries an electronic terminal 50 and collates the authenticity of the admission card 40 by capturing the collation image 43 of the admission card 40 presented by the participant 13. For example, the electronic terminal 50 is a tablet terminal including a camera and is communicably connected to the collation apparatus 20 in a wireless or wired manner.

The staff captures the collation image 43 of the admission card 40 by operating the electronic terminal 50. The electronic terminal 50 acquires a second captured image P2 by capturing the collation image 43. A time point (hereinafter, referred to as a second imaging time point) T2 at which the collation image 43 is captured is added to the second captured image P2. In a case where the second captured image P2 is acquired, the electronic terminal 50 transmits the second captured image P2 to the collation apparatus 20.

The collation apparatus 20 is composed of a personal computer, a server apparatus, or the like. In a case where the second captured image P2 is received from the electronic terminal 50, the collation apparatus 20 acquires the first captured image P1 from the database 30 and performs collation between the first captured image P1 and the second captured image P2. In a case where collation ends, the collation apparatus 20 transmits a collation result to the electronic terminal 50. The staff of the admission gate determines whether or not to permit entrance of the participant 13 to the event venue based on the collation result received by the electronic terminal 50 from the collation apparatus 20.

The electronic terminal 50 may be installed at the admission gate. In this case, the participant 13 may capture the collation image 43 of the admission card 40 via the electronic terminal 50 by operating the electronic terminal 50.

Figure 2:
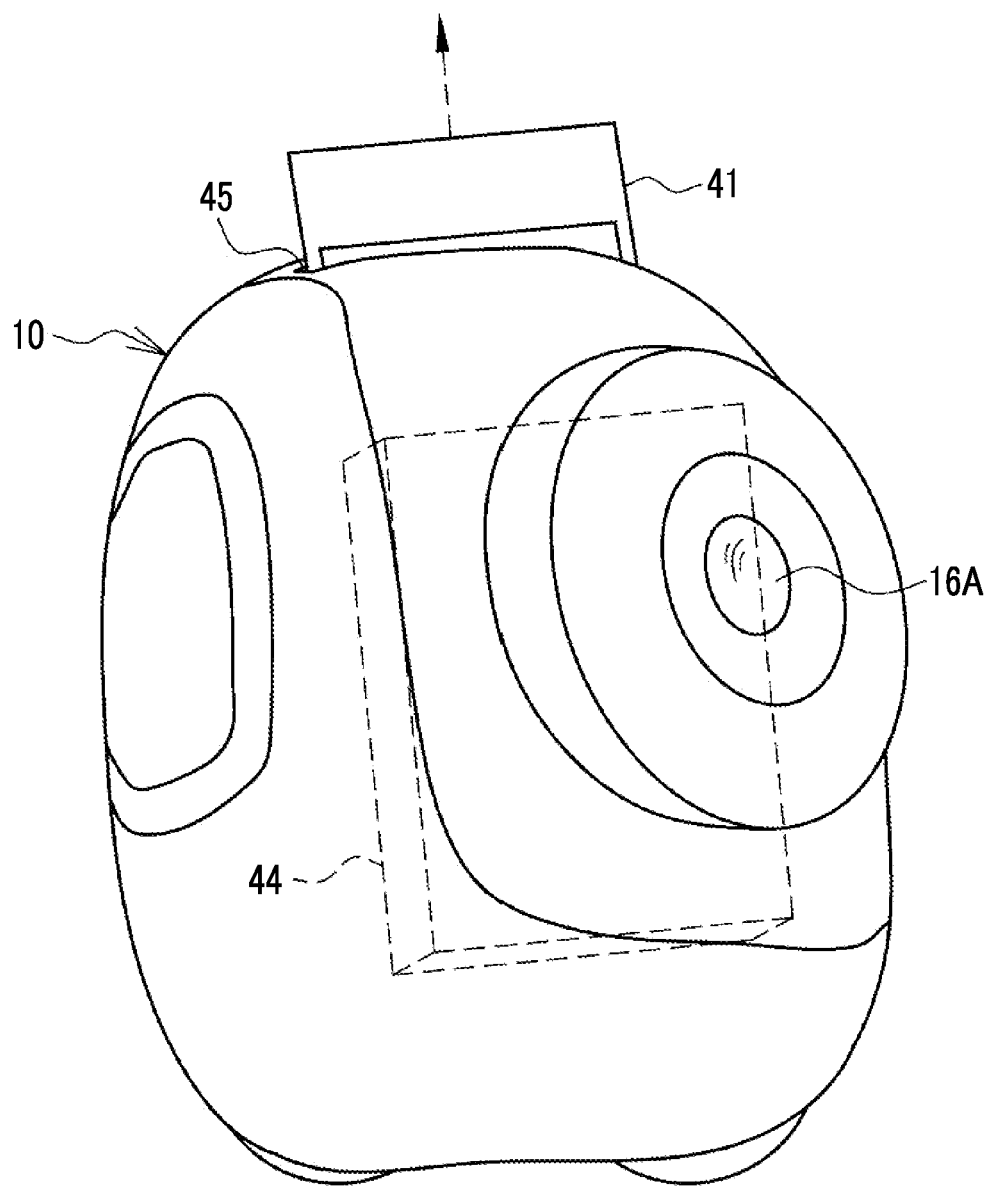
FIG. 2 is a diagram illustrating an example of an external configuration of an issuing apparatus.

FIG. 2 illustrates an example of an external configuration of the issuing apparatus 10. As illustrated in FIG. 2, the issuing apparatus 10 has a housing having a rounded box shape as a whole. As described above, the issuing apparatus 10 of the present example is an instant camera, and a film pack 44 of the instant film 41 is interchangeably loaded inside the housing. A plurality of sheets (for example, 10 sheets) of unused instant films 41 are accommodated in the film pack 44.

A printer 18 (refer to FIG. 3) is provided inside the issuing apparatus 10. The printer 18 prints information including the face image 42 and the collation image 43 on the instant film 41. The printed instant film 41 is discharged outside from a discharge port 45 formed in an upper part of the housing. Images printed on the instant film 41 are known to have a change in color optical density in accordance with an elapse of time. A characteristic of a change in time of the color optical density is different for each printed color. Hereinafter, the "color optical density" will be simply referred to as the "density".

Figure 3:
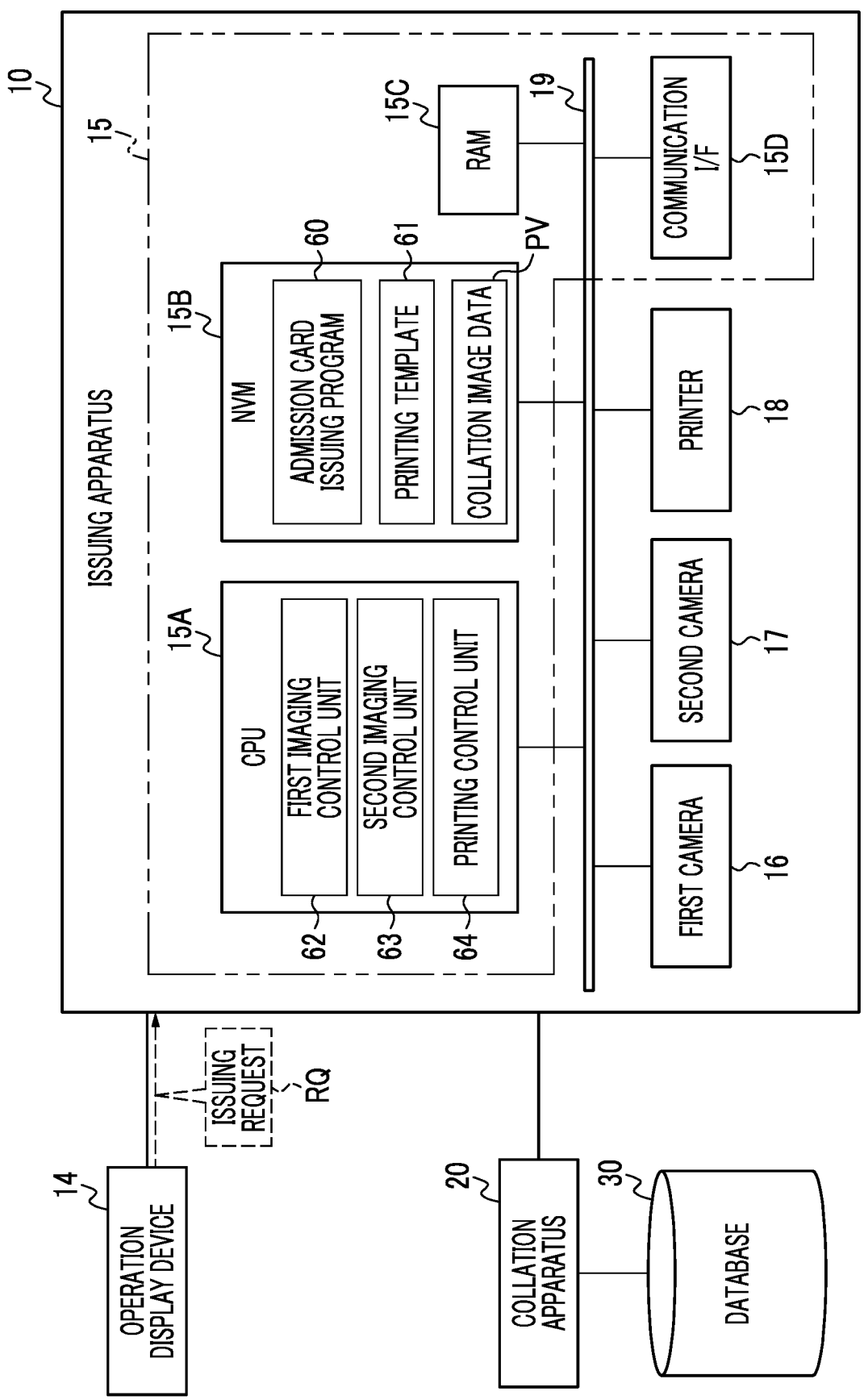
FIG. 3 is a diagram illustrating an example of an internal configuration of the issuing apparatus.

FIG. 3 illustrates an example of an internal configuration of the issuing apparatus 10. As illustrated in FIG. 3, the issuing apparatus 10 includes a computer 15, a first camera 16, a second camera 17, and the printer 18. The computer 15 includes a central processing unit (CPU) 15A, a non-volatile memory (NVM) 15B, a random access memory (RAM) 15C, and a communication interface (I/F) 15D. The CPU 15A, the NVM 15B, the RAM 15C, the communication I/F 15D, the first camera 16, the second camera 17, and the printer 18 are connected to each other through a bus 19.

The CPU 15A controls the entire issuing apparatus 10. The NVM 15B is, for example, an electrically erasable programmable read-only memory (EEPROM) but is not limited thereto and may be a flash memory. The RAM 15C is a volatile memory and is used as a work memory by the CPU 15A.

The communication I/F 15D is implemented by, for example, a device including a field-programmable gate array (FPGA). The communication I/F 15D is connected to the operation display device 14 and communicates with the operation display device 14. In addition, the communication I/F 15D is connected to the collation apparatus 20 and communicates with the collation apparatus 20.

Each of the first camera 16 and the second camera 17 is an imaging apparatus composed of, for example, a complementary metal oxide semiconductor (CMOS) type image sensor and of an optical system. The first camera 16 generates the face image 42 including a face by imaging a region including the face of the participant 13 through a lens 16A (refer to FIG. 2) provided on a front surface of the housing. The second camera 17 is an incorporated camera provided inside the housing. In a case where the instant film 41 is output from the printer 18, the second camera 17 generates the first captured image P1 by capturing the collation image 43 printed on the instant film 41 and adds the first imaging time point T1 to the first captured image P1. The second camera 17 is an example of a "camera" according to the embodiment of the disclosed technology.

In the present example, the printer 18 is an instant photo printer that prints images on the instant film 41 as a substrate. For example, an image display device such as a liquid crystal display (LCD) is used as an exposure device in the printer 18. In the printer 18, the exposure device is disposed in a posture in which an image display surface on which images are displayed faces a photosensitive surface of the instant film 41. The printer 18 exposes a photosensitive material of the instant film 41 to light by displaying images to be printed on the exposure device. As described above, the instant film 41 is a film that develops color based on the photosensitive material including a silver salt. In addition, since the printer 18 uses the instant film 41 as a substrate, the printer 18 is, of course, a printer of a density modulation system that forms images by changing the color optical density of the substrate in accordance with an exposure amount.

An admission card issuing program 60 is stored in the NVM 15B. The CPU 15A functions as a first imaging control unit 62, a second imaging control unit 63, and a printing control unit 64 by reading out the admission card issuing program 60 into the RAM 15C from the NVM 15B and by executing processing based on the read admission card issuing program 60. The first imaging control unit 62 controls imaging operation of the first camera 16. The second imaging control unit 63 controls imaging operation of the second camera 17. The printing control unit 64 controls printing operation of the printer 18. The first imaging control unit 62, the second imaging control unit 63, and the printing control unit 64 perform admission card issuing processing in cooperation with each other. The admission card issuing processing starts in response to an issuing request RQ input from the operation display device 14.

In the NVM 15B, a printing template 61 of the admission card 40 and the collation image data PV are stored in addition to the admission card issuing program 60. The printing template 61 is data that defines disposition and the like of the face image 42 and the collation image 43 to be printed on the instant film 41. The collation image data PV is acquired from the database 30 and stored in the NVM 15B.

Figure 4:
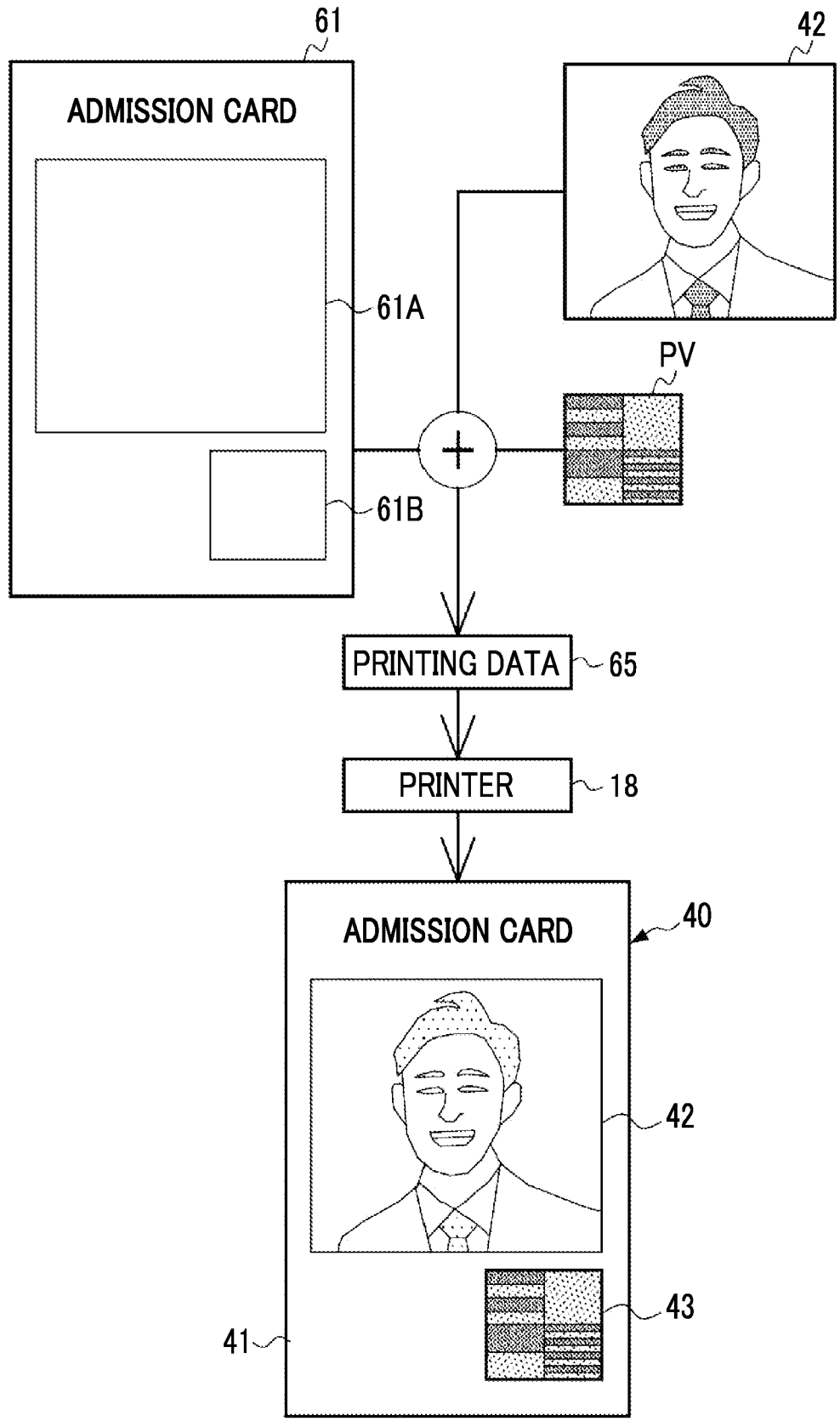
FIG. 4 is a diagram illustrating an example of printing processing.

FIG. 4 illustrates an example of printing processing of the admission card 40 using the printing template 61. As illustrated in FIG. 4, a first area 61A for disposing the face image 42 and a second area 61B for disposing the collation image 43 are defined in the printing template 61. The printing control unit 64 creates printing data 65 by assigning the face image 42 acquired by the first camera 16 to the first area 61A and by assigning the collation image data PV to the second area 61B. The printing control unit 64 causes the printer 18 to execute the printing operation based on the created printing data 65. The admission card 40 is created by performing printing based on the printing data 65 on the instant film 41.

FIG. 5 illustrates an example of reception processing performed by the operation display device 14. The operation display device 14 is operated by the participant 13. First, as illustrated in FIG. 5, for example, a message "Welcome to advanced industrial technology exhibition!" and an admission card creation button 70 for prompting creation of the admission card 40 are displayed on a display screen of the operation display device 14. In a case where the admission card creation button 70 is touched by the participant 13, the display screen transitions.

A preview image 71 captured by the first camera 16 and an imaging button 72 for prompting execution of imaging are displayed on the display screen after the transition. In addition, a message "Face image to be printed on admission card will be captured. Touching imaging button will execute imaging." is displayed on the display screen. In a case where the imaging button 72 is touched by the participant 13, the imaging operation of the first camera 16 is performed, and then the printing operation of the printer 18 is performed.

Figure 6:
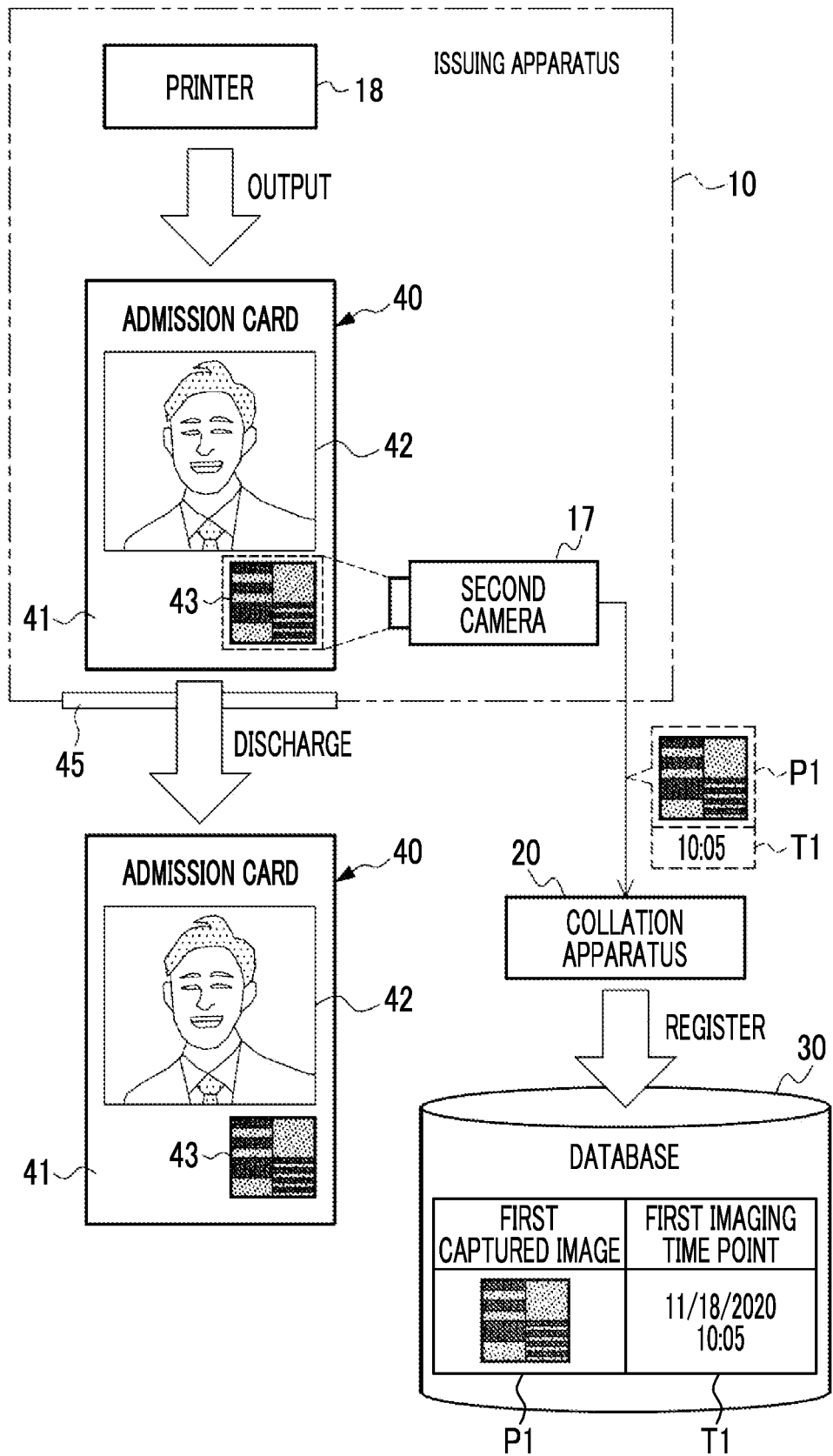
FIG. 6 is a diagram illustrating an example of discharge processing.

FIG. 6 illustrates an example of discharge processing of the admission card 40. As illustrated in FIG. 6, the admission card 40 printed by the printer 18 is imaged by the second camera 17 inside the issuing apparatus 10 after being output from the printer 18 and before being discharged from the discharge port 45. The second camera 17 generates the first captured image P1 by imaging a region including the collation image 43 printed on the admission card 40 and adds the first imaging time point T1 to the first captured image P1. The first captured image P1 is registered in the database 30 through the collation apparatus 20.

Figure 7:
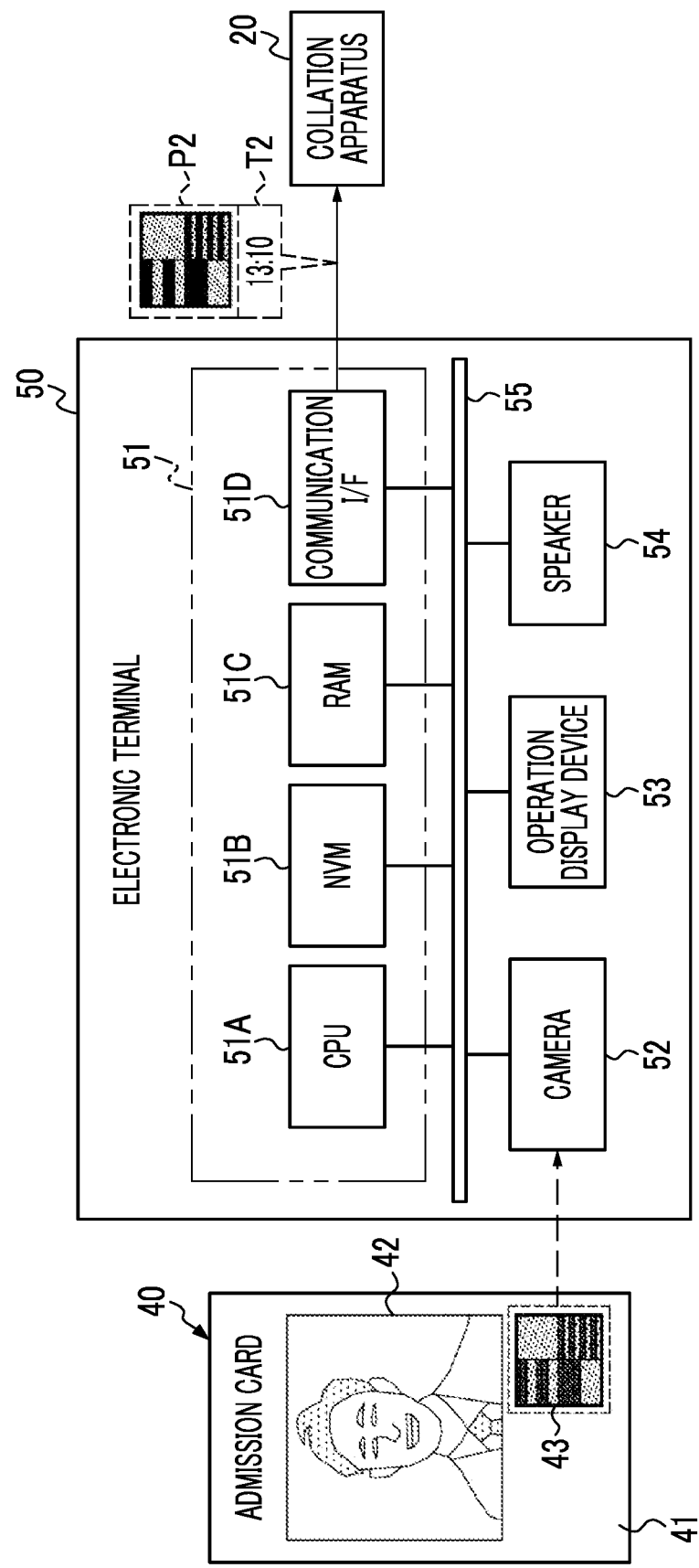
FIG. 7 is a diagram illustrating an example of an internal configuration of an electronic terminal.

FIG. 7 illustrates an example of an internal configuration of the electronic terminal 50. As illustrated in FIG. 7, the electronic terminal 50 includes a computer 51, a camera 52, an operation display device 53, and a speaker 54. The computer 51 includes a CPU 51A, an NVM 51B, a RAM 51C, and a communication I/F 51D. The CPU 51A, the NVM 51B, the RAM 51C, the communication I/F 51D, the camera 52, the operation display device 53, and the speaker 54 are connected to each other through a bus 55. The communication I/F 51D communicates with the collation apparatus 20. The camera 52 is, for example, an imaging apparatus composed of a CMOS type image sensor and of an optical system. The operation display device 53 is, for example, a display device including a touch panel.

Figure 8:
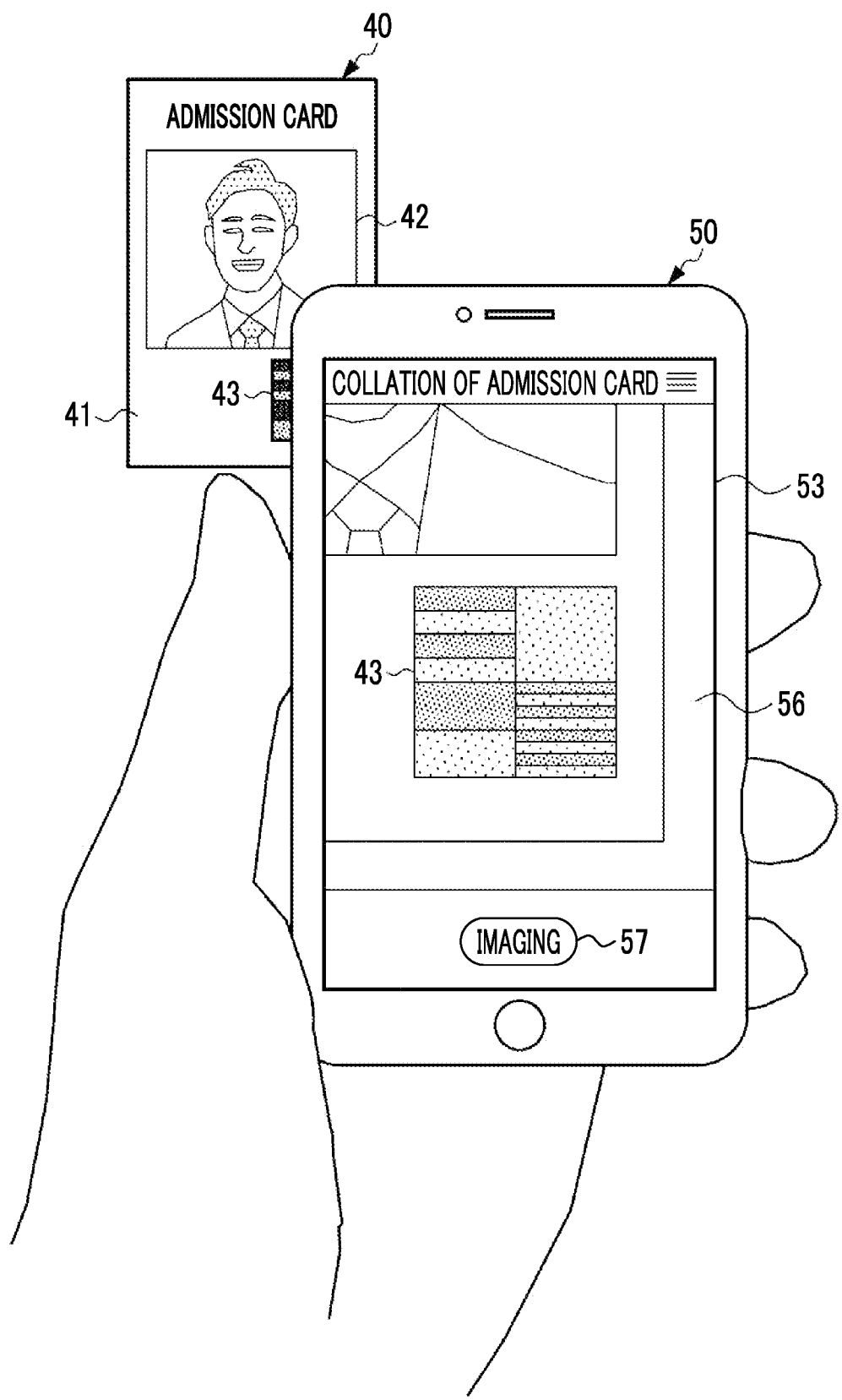
FIG. 8 is a diagram illustrating a state of imaging an admission card via the electronic terminal.

As described above, for example, the electronic terminal 50 is a tablet terminal including a camera and is operated by the staff who manages the admission gate. For example, as illustrated in FIG. 8, the staff captures the collation image 43 of the admission card 40 presented by the participant 13 in a state of holding the electronic terminal 50 in a hand. At this point, a preview image 56 of a captured image including the collation image 43 captured by the camera 52 and an imaging button 57 for prompting execution of imaging are displayed on a display screen of the operation display device 53.

In a case where the imaging button 57 is touched by the staff, imaging operation of the region including the collation image 43 is performed by the camera 52. The camera 52 generates the second captured image P2 and adds the second imaging time point T2 to the second captured image P2. The second captured image P2 generated by the camera 52 is transmitted to the collation apparatus 20 through the communication I/F 51D.

Figure 9:
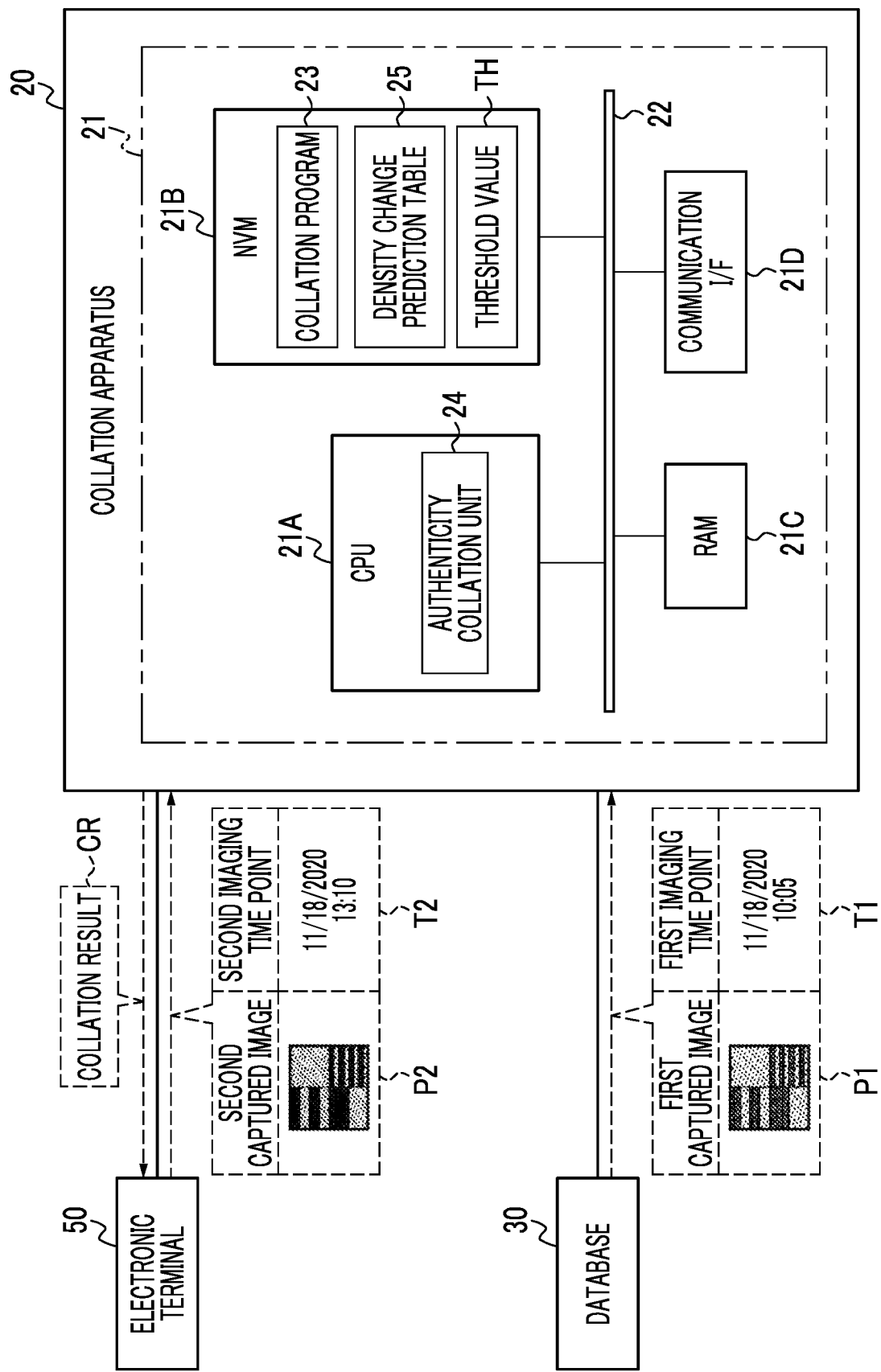
FIG. 9 is a diagram illustrating an example of an internal configuration of a collation apparatus.

FIG. 9 illustrates an example of an internal configuration of the collation apparatus 20. As illustrated in FIG. 9, the collation apparatus 20 includes a computer 21. The computer 21 includes a CPU 21A, an NVM 21B, a RAM 21C, and a communication I/F 21D. The CPU 21A, the NVM 21B, the RAM 21C, and the communication I/F 21D are connected to each other through a bus 22. The communication I/F 21D communicates with the issuing apparatus 10, the electronic terminal 50, and the database 30.

A collation program 23 is stored in the NVM 21B. The CPU 21A functions as an authenticity collation unit 24 by reading out the collation program 23 into the RAM 21C from the NVM 21B and by executing processing based on the read collation program 23. In a case where the second captured image P2 is received from the collation apparatus 20, the authenticity collation unit 24 acquires the corresponding first captured image P1 of the admission card 40 from the database 30 and performs collation between the first captured image P1 and the second captured image P2.

In the NVM 21B, a density change prediction table 25 and a threshold value TH are stored in addition to the collation program 23. As will be described in detail later, the authenticity collation unit 24 determines a region (hereinafter, referred to as a collation region) in which collation between the first captured image P1 and the second captured image P2 is to be performed, using the density change prediction table 25 and the threshold value TH. The authenticity collation unit 24 performs collation based on the collation region and then transmits a collation result CR to the electronic terminal 50.

The admission card 40 is carried by the participant 13 after being issued by the issuing apparatus 10 at the reception counter. Thus, the admission card 40 may be stained or scratched on a surface. Particularly, in a case where the collation image 43 of the admission card 40 is stained or scratched, stains are reflected on the second captured image P2 acquired by the electronic terminal 50 at the admission gate. Thus, collation accuracy between the first captured image P1 and the second captured image P2 is decreased. In a case where the participant 13 repeats entrance to and exit from the event venue, stains or scratches are accumulated on the admission card 40. Thus, the collation accuracy is further decreased.

In the first embodiment, the authenticity collation unit 24 performs processing of detecting a stained region in the collation image 43 and of determining a region other than the stained region as the collation region based on the first captured image P1 and on the second captured image P2. In the present disclosure, the stained region is not limited to a region in which images are not clear because of stains, and includes a region in which images are not clear because of scratches and the like.

Figure 10:
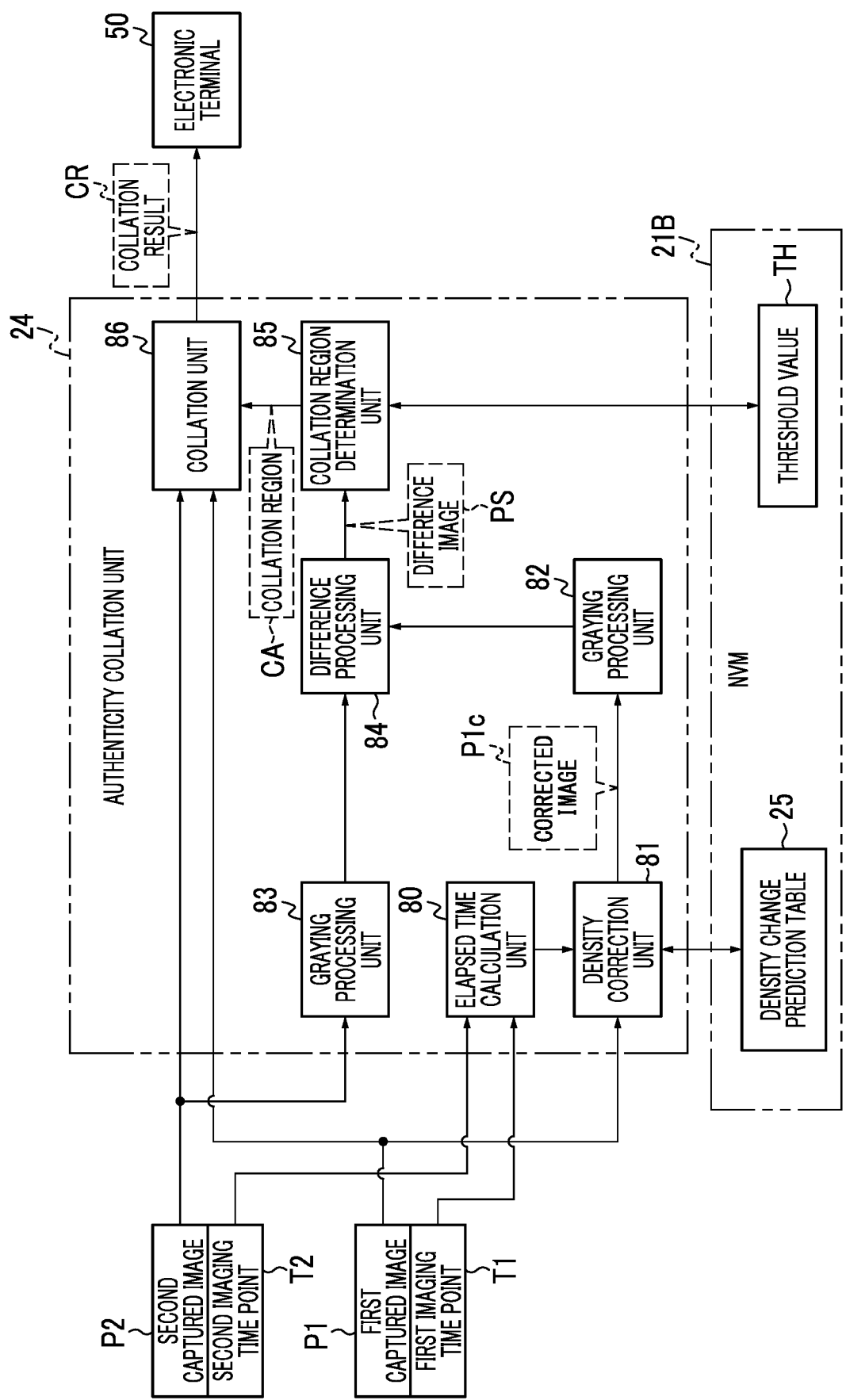
FIG. 10 is a diagram illustrating an example of a functional configuration of an authenticity collation unit.

FIG. 10 illustrates an example of a functional configuration of the authenticity collation unit 24. As illustrated in FIG. 10, the authenticity collation unit 24 is composed of an elapsed time calculation unit 80, a density correction unit 81, graying processing units 82 and 83, a difference processing unit 84, a collation region determination unit 85, and a collation unit 86.

The elapsed time calculation unit 80 calculates an elapsed time by subtracting the first imaging time point T1 added to the first captured image P1 from the second imaging time point T2 added to the second captured image P2. This elapsed time corresponds to a time from issuing of the admission card 40 at the reception counter to collation of the admission card 40 at the admission gate.

The density correction unit 81 corrects a density of the first captured image P1 based on the elapsed time calculated by the elapsed time calculation unit 80 and on the density change prediction table 25 stored in the NVM 21B. The density change prediction table 25 is data representing a relationship between the elapsed time and a density change. That is, the density correction unit 81 performs density correction on the first captured image P1 by predicting a density change at the second imaging time point T2 at which the second captured image P2 is acquired, based on the elapsed time from the first imaging time point T1 at which the first captured image P1 is acquired.

The characteristic of a change in time of the color optical density of the image printed on the instant film 41 is different for each color. Thus, for example, the density correction unit 81 performs the density correction for each color of red (R), green (G), and blue (B). In the density change prediction table 25, a density change characteristic representing a relationship between the elapsed time and the density change is recorded for each color of R, G, and B. A corrected image P1c on which the density correction is performed by the density correction unit 81 has almost the same density as the second captured image P2.

The graying processing unit 82 performs graying processing of converting the corrected image P1c generated by the density correction unit 81 into an achromatic image and inputs the grayed corrected image P1c into the difference processing unit 84. The graying processing unit 83 also performs graying processing of converting the second captured image P2 into an achromatic image and inputs the grayed second captured image P2 into the difference processing unit 84.

The difference processing unit 84 generates a difference image PS by obtaining a difference between the corrected image P1c and the second captured image P2 for each pixel. In the present embodiment, for example, the difference processing unit 84 generates the difference image PS having positive pixel values by calculating an absolute value of a difference value for each pixel.

The collation region determination unit 85 determines a collation region CA for collation between the first captured image P1 and the second captured image P2 based on the difference image PS. Specifically, by using the threshold value TH stored in the NVM 21B, the collation region determination unit 85 determines a region in which absolute values of the pixel values of the difference image PS are less than or equal to the threshold value TH as the collation region CA.

The collation unit 86 collates the authenticity of the admission card 40 by comparing information (for example, a spatial frequency characteristic) included in the collation region CA determined by the collation region determination unit 85 between the first captured image P1 and the second captured image P2.

The image printed on the instant film 41 has uncertainty in the color optical density. The uncertainty in the color optical density refers to a difference in a state of occurrence of density unevenness for each printing even in a case where identical images are printed on identical substrates. One reason for the uncertainty in the color optical density is that a distribution of a developer applied to a printing surface in a development process is not even in the entire region of the printing surface. Another reason is that a distribution of the photosensitive material that is a coloring material developing color is also not even in the entire region of the printing surface. Accordingly, unevenness of the developer, the photosensitive material, and the like on the printing surface occurs even in one instant film 41.

That is, the collation image 43 printed on the admission card 40 has unique density unevenness. The state of occurrence of the density unevenness appears as a spatial frequency characteristic of the color optical density of the image. Thus, in the disclosed technology, the authenticity of the admission card 40 is collated using the difference in the spatial frequency characteristic of the color optical density of the image for each printing even in a case where identical images are printed on identical substrates.

In a case where the first captured image P1 and the second captured image P2 are images obtained by capturing the identical collation image 43 of the admission card 40, the spatial frequency characteristics of both almost match. The collation unit 86 collates the authenticity of the admission card 40 by performing frequency analysis processing such as two-dimensional Fourier transform on the first captured image P1 and on the second captured image P2 to acquire the spatial frequency characteristics in the collation region CA and by comparing the acquired spatial frequency characteristics. The collation unit 86 determines that the admission card 40 is authentic in a case where a ratio of match between the spatial frequency characteristics is greater than or equal to a predetermined value, and determines that the admission card 40 is not authentic in a case where the ratio of match is less than the predetermined value. The collation unit 86 transmits the collation result CR to the electronic terminal 50.

Figure 11:
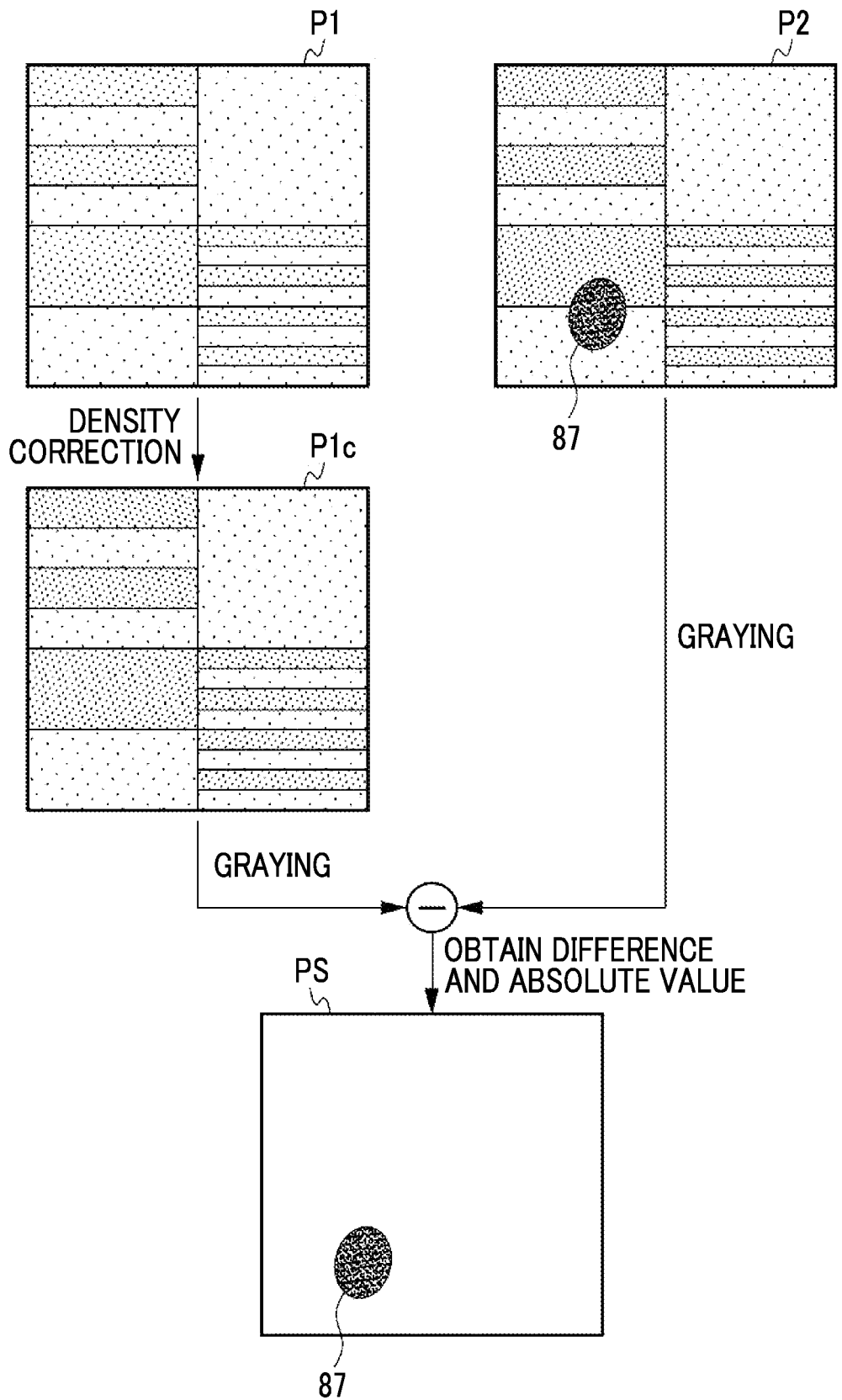
FIG. 11 is a diagram schematically illustrating an example of difference image generation processing.

FIG. 11 schematically illustrates an example of difference image generation processing of generating the difference image PS based on the first captured image P1 and on the second captured image P2. In FIG. 11, reference numeral 87 represents the stained region that has occurred in the collation image 43 of the admission card 40. The stained region 87 occurs after the first captured image P1 is acquired and before the second captured image P2 is acquired. Thus, the stained region 87 occurs in only the second captured image P2.

Since the second captured image P2 is a pattern image, a difference in contrast between the stained region 87 and the other region is not necessarily large. Thus, it is not easy to detect the stained region 87 based on only the second captured image P2. Performing the generation processing of the difference image PS results in values close to zero as pixel values in the region other than the stained region 87 and values not close to zero as pixel values in the stained region 87. Accordingly, by generating the difference image PS, the stained region 87 can be easily detected.

Figure 12:
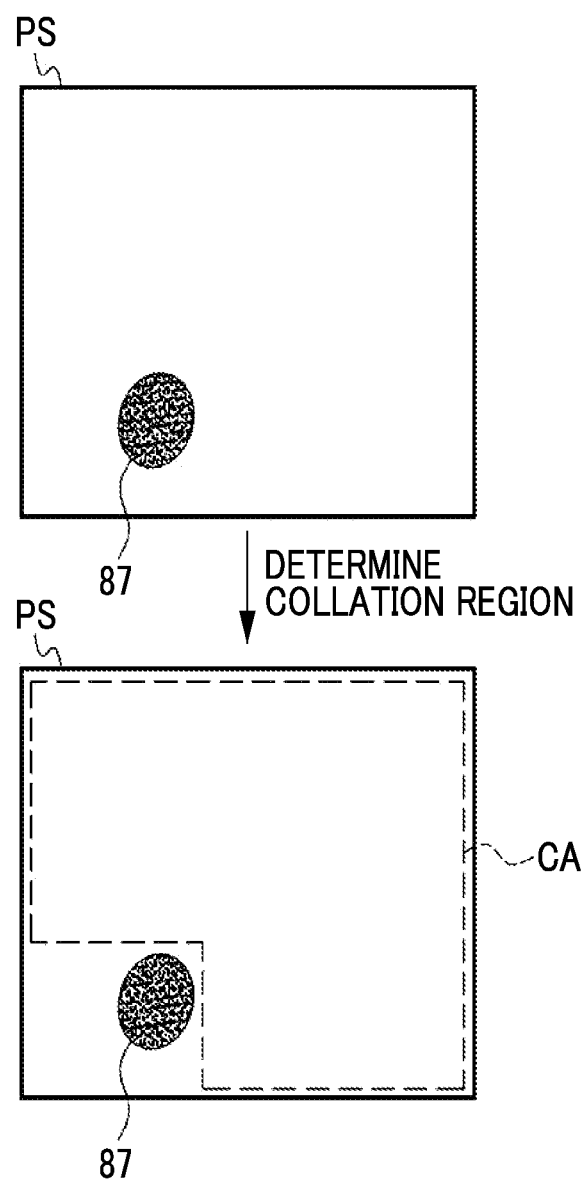
FIG. 12 is a diagram schematically illustrating an example of collation region determination processing.

FIG. 12 schematically illustrates an example of determination processing of the collation region CA by the collation region determination unit 85. As illustrated in FIG. 12, the collation region determination unit 85 determines the collation region CA from the region in which the absolute values of the pixel values of the difference image PS are less than or equal to the threshold value TH (that is, the region other than the stained region 87). The collation region determination unit 85 may determine the entire region other than the stained region 87 as the collation region CA or may determine a part of the region other than the stained region 87 as the collation region CA. A shape of the collation region CA determined by the collation region determination unit 85 is not limited, and the collation region CA may have a rectangular shape.

Figure 13:
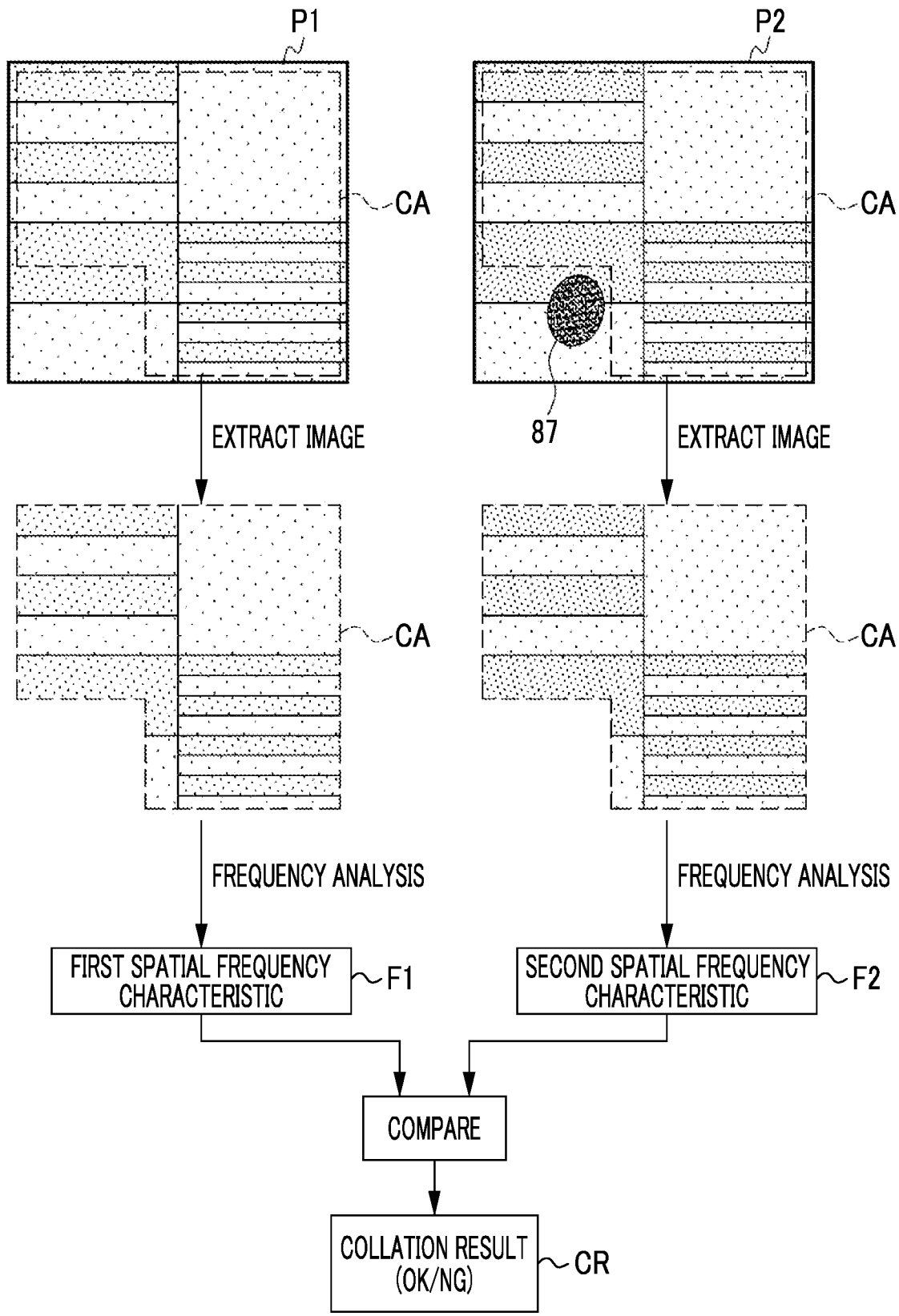
FIG. 13 is a diagram schematically illustrating an example of collation processing.

FIG. 13 schematically illustrates an example of collation processing performed by the collation unit 86. As illustrated in FIG. 13, the collation unit 86 acquires a first spatial frequency characteristic F1 by extracting an image from a region corresponding to the collation region CA in the first captured image P1 and by performing frequency analysis on the extracted image. The collation unit 86 also acquires a second spatial frequency characteristic F2 by extracting an image from a region corresponding to the collation region CA in the second captured image P2 and by performing frequency analysis on the extracted image. The collation unit 86 generates the collation result CR by comparing the first spatial frequency characteristic F1 with the second spatial frequency characteristic F2 to determine whether or not the rate of match is greater than or equal to the predetermined value. Methods based on machine learning can be used for calculating the rate of match between the first spatial frequency characteristic F1 and the second spatial frequency characteristic F2.

While the first captured image P1 and the second captured image P2 have different densities because of a difference between imaging time points thereof, the density change evenly occurs in the entire image. Thus, a difference in the spatial frequency caused by the difference in density is small. Thus, collation can be performed using the first captured image P1 and the second captured image P2 having different densities. The collation unit 86 may perform collation using the first captured image P1 and the second captured image P2 that are grayed. Furthermore, the collation unit 86 may perform collation using the corrected image P1c and the second captured image P2.

Figure 14:
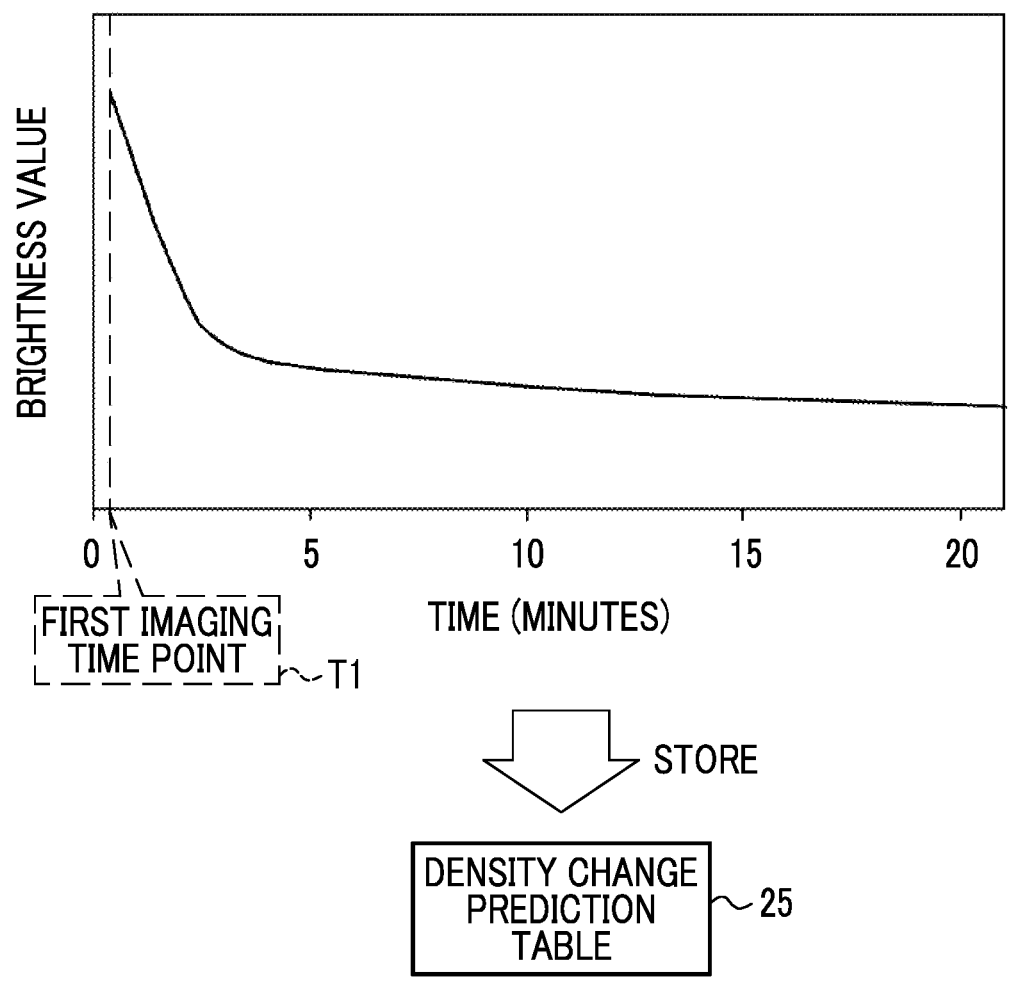
FIG. 14 is a diagram illustrating an example of a density change characteristic stored in a density change prediction table.

FIG. 14 illustrates an example of the density change characteristic stored in the density change prediction table 25. For example, the graph shown in FIG. 14 shows a change in time of the color optical density of the collation image 43 from the first imaging time point T1. In FIG. 14, "0 minutes" indicates a time point at which the collation image 43 is printed on the instant film 41 by the printer 18. The first imaging time point T1 is a time point after an elapse of several seconds or of several tens of seconds from printing of the collation image 43 on the instant film 41.

In the graph shown in FIG. 14, a vertical axis is a brightness value. The higher the brightness value is, the lower the density is. The lower the brightness value is, the higher the density is. In the instant film 41, color development rapidly proceeds in a short time (approximately three minutes) immediately after printing. Thus, an increase in the density (that is, a decrease in the brightness value) in this period is rapid. Then, the density is smoothly increased. Since a change in time of the color optical density of the instant film 41 has the tendency illustrated in FIG. 14, the color optical density of the instant film 41 can be predicted based on the elapsed time after printing.

In the density change prediction table 25, for example, the density change characteristic is stored for each color of R, G, and B. For example, the density change characteristic stored in the density change prediction table 25 is a value derived through experiment using an actual apparatus and/or through computer simulation. An operation formula that takes the elapsed time from the first imaging time point T1 as an independent variable and that takes the color optical density as a dependent variable may be used instead of the density change prediction table 25.

Figure 15:
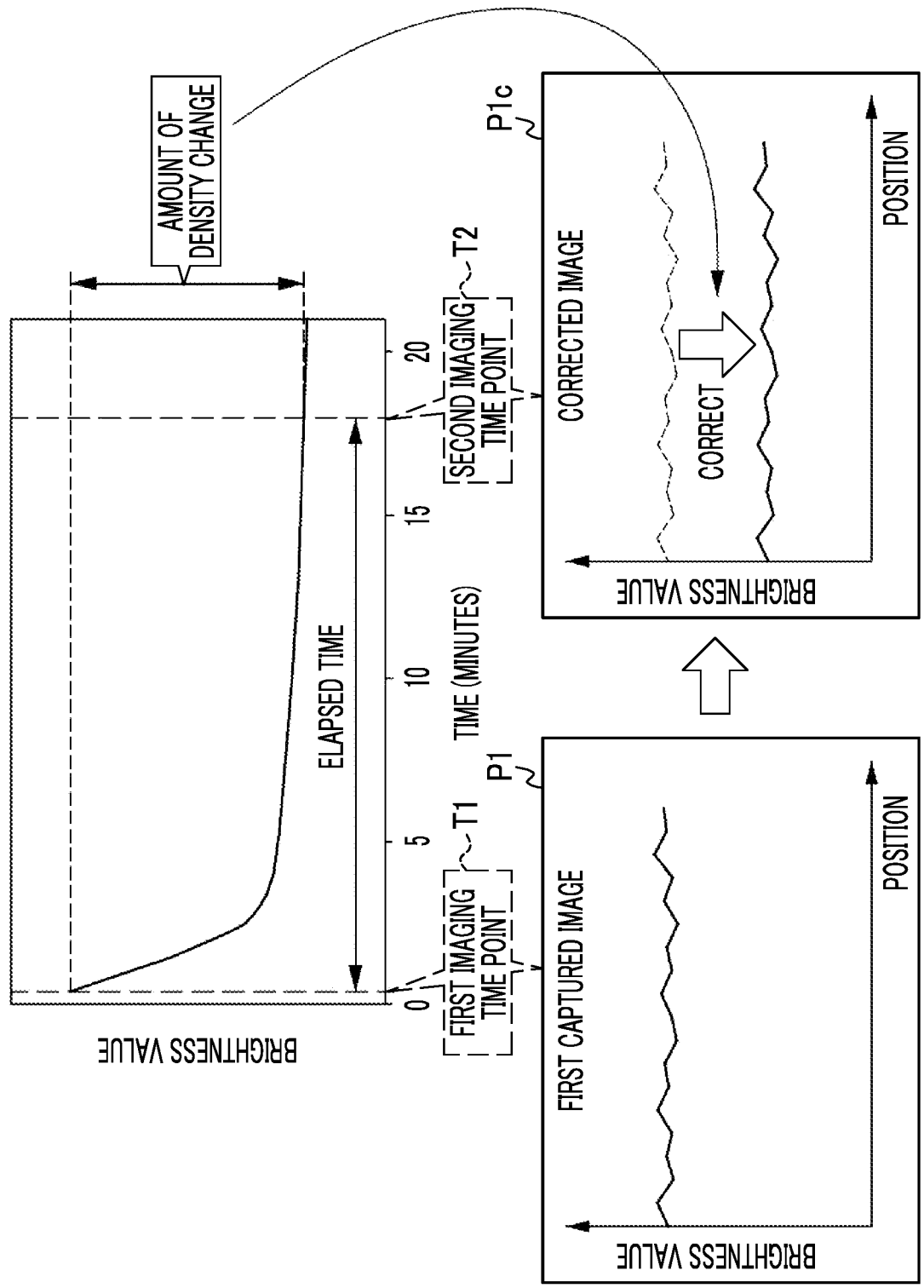
FIG. 15 is a diagram for describing an example of density correction processing in detail.

FIG. 15 describes an example of density correction processing in detail. The density correction unit 81 obtains an amount of the density change that changes between the first imaging time point T1 and the second imaging time point T2, based on the elapsed time calculated by the elapsed time calculation unit 80 and on the density change characteristic stored in the density change prediction table 25. The density correction unit 81 generates the corrected image P1c by correcting each pixel value of the first captured image P1 using the obtained amount of the density change as a correction value.

Figure 16:
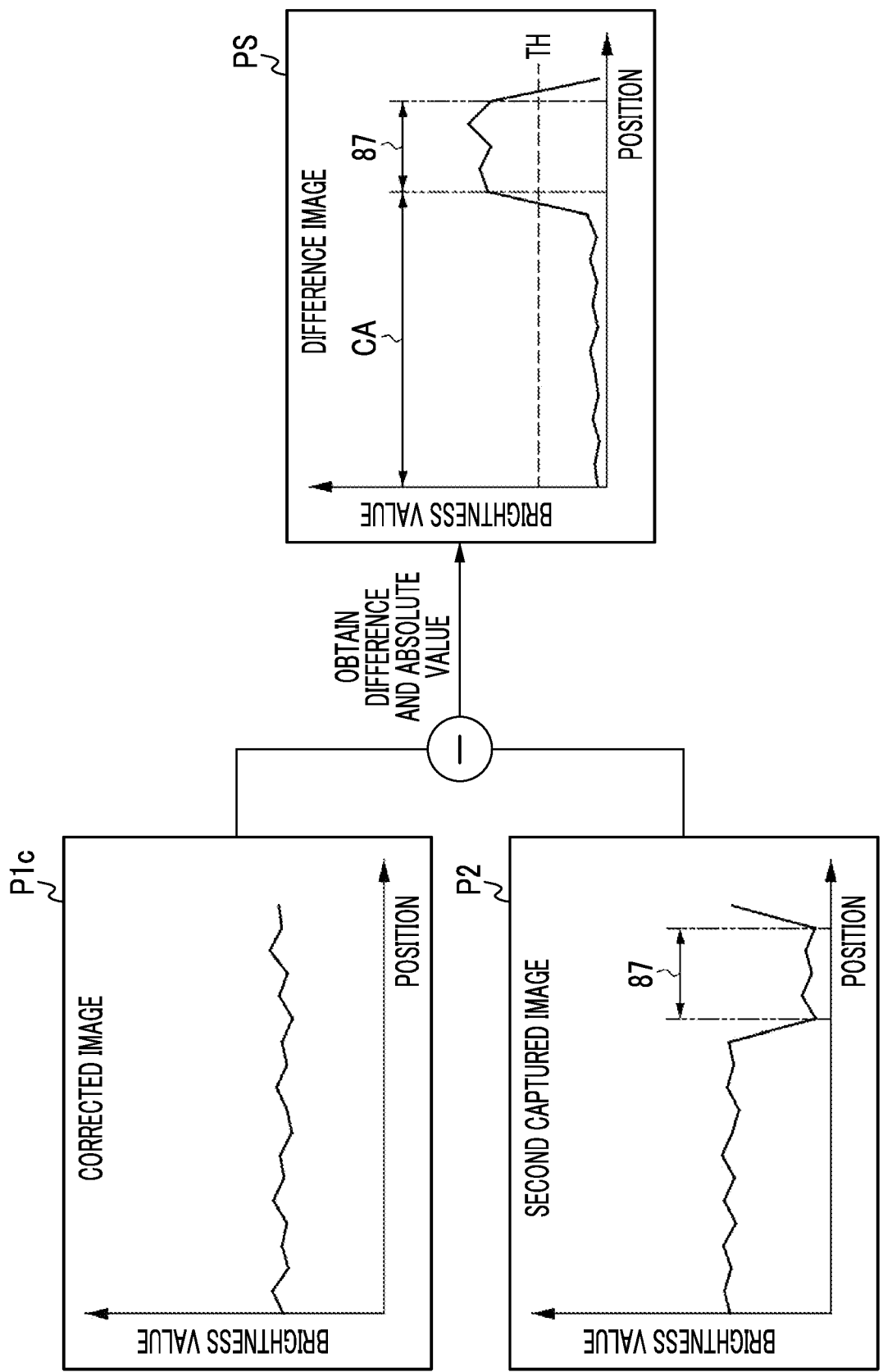
FIG. 16 is a diagram for describing an example of difference processing and of the collation region determination processing in detail.

FIG. 16 describes an example of difference processing and of collation region determination processing in detail. As illustrated in FIG. 16, the difference processing unit 84 generates the difference image PS by subtracting one of the corrected image P1c and the second captured image P2 from the other for each pixel and by calculating the absolute values of the subtracted values. Among the pixel values of the difference image PS, the pixel values of other than the stained region 87 are values close to zero.

The collation region determination unit 85 compares the pixel values of the difference image PS with the threshold value TH and determines at least a part of the region of the pixel values less than or equal to the threshold value TH as the collation region CA. The threshold value TH is set to a value with which the stained region 87 and the collation region CA can be separated from each other. For example, the threshold value TH is a value derived through experiment using an actual apparatus and/or through computer simulation.

The difference processing unit 84 may not calculate the absolute values of the pixel values of the difference. In this case, the pixel values of the difference image PS have positive and negative values. Thus, the threshold value TH may be set on each of a positive side and a negative side.

Figure 17:
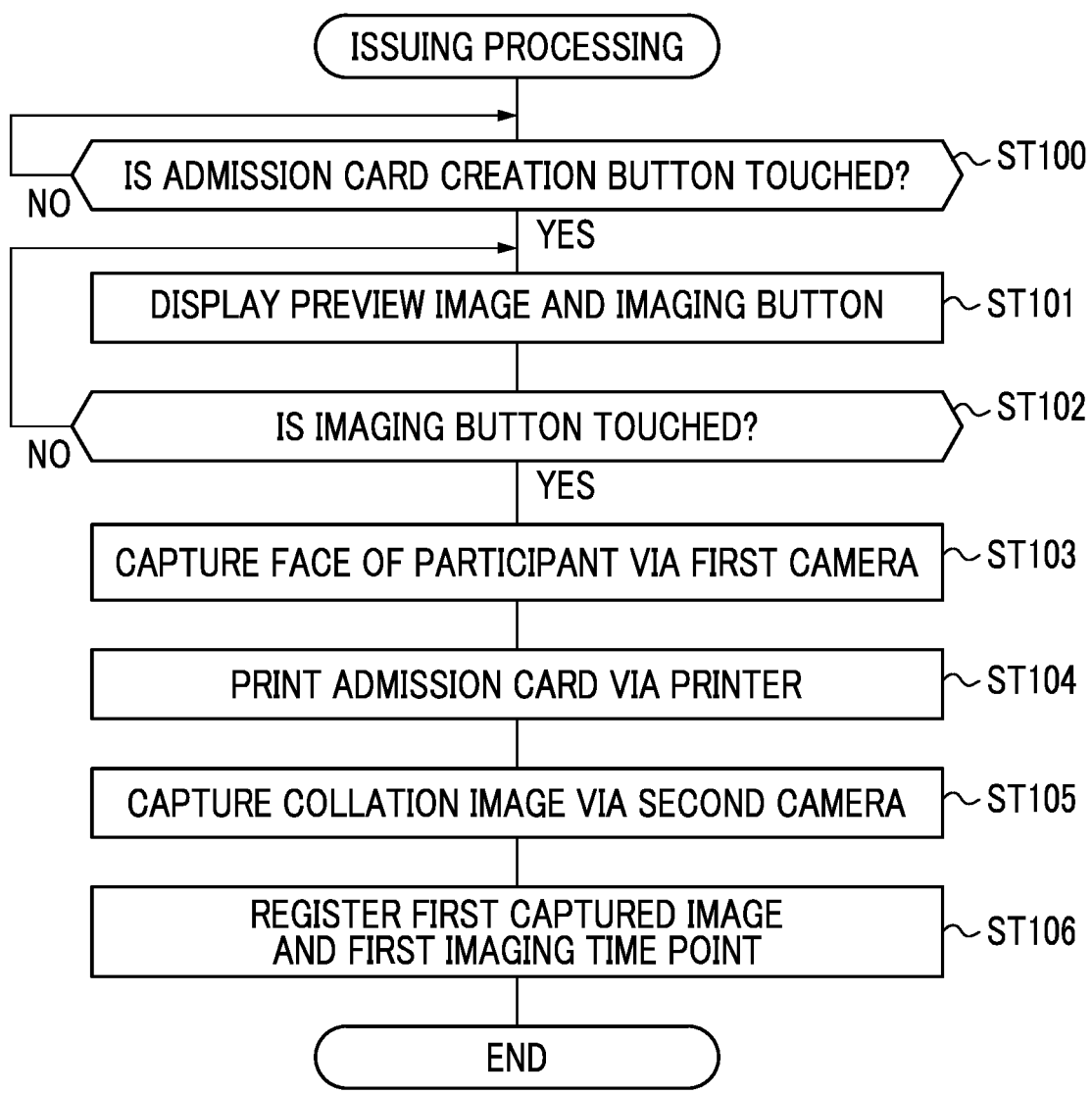
FIG. 17 is a flowchart illustrating an example of a flow of issuing processing.

Next, actions of the above configuration will be described with reference to the flowcharts illustrated in FIG. 17 and FIG. 18. As illustrated in FIG. 17, first, the operation display device 14 determines whether or not the admission card creation button 70 (refer to FIG. 5) is touched by the participant 13 who has visited the reception counter (step ST100). In a case where it is determined that the admission card creation button 70 is touched by the participant 13 (step ST100: YES), the operation display device 14 transitions the display screen to display the preview image 71 and the imaging button 72 (step ST101). An image that is captured by the first camera 16 of the issuing apparatus 10 and that includes the face of the participant 13 is displayed as a preview in the preview image 71.

Next, the operation display device 14 determines whether or not the imaging button 72 is touched by the participant 13 (step ST102). In a case where it is determined that the imaging button 72 is not touched by the participant 13 (step ST102: NO), the operation display device 14 returns the processing to step ST101 and continues displaying the preview image 71. In a case where the operation display device 14 determines that the imaging button 72 is touched by the participant 13 (step ST102: YES), the issuing apparatus 10 acquires the face image 42 by capturing the image including the face of the participant 13 via the first camera 16 (that is, main imaging) (step ST103).

Next, the issuing apparatus 10, as illustrated in FIG. 4, prints the admission card 40 by causing the printer 18 to perform the printing operation based on the printing data 65 created with the printing template 61, the face image 42, and the collation image data PV (step ST104). In a case where the admission card 40 is output from the printer 18, the issuing apparatus 10 causes the second camera 17 to image the region including the collation image 43 printed on the admission card 40 as illustrated in FIG. 6 (step ST105). The issuing apparatus 10 registers the first captured image P1 acquired by the second camera 17 and the first imaging time point T1 in the database 30 through the collation apparatus 20 (step ST106).

Then, the participant 13 heads toward the admission gate with the admission card 40 issued by the issuing apparatus 10, and the admission card 40 is collated by the electronic terminal 50 carried by the staff at the admission gate. The staff images the region including the collation image 43 of the admission card 40 via the camera 52 of the electronic terminal 50 (refer to FIG. 7 and FIG. 8). The second imaging time point T2 is added to the second captured image P2 acquired by the camera 52, and the second captured image P2 is transmitted to the collation apparatus 20.

Figure 18:
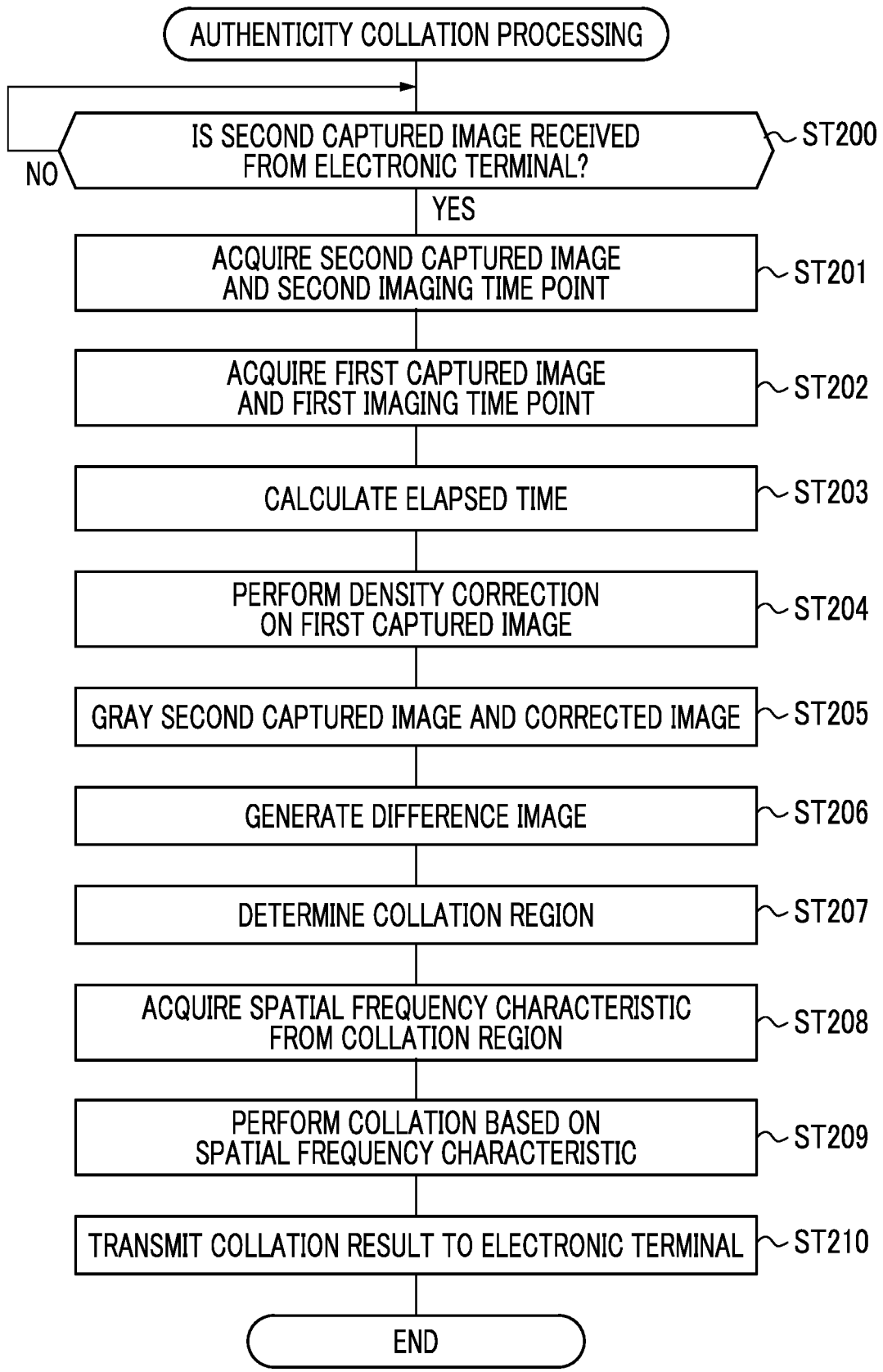
FIG. 18 is a flowchart illustrating an example of a flow of authenticity collation processing.

Next, as illustrated in FIG. 18, the collation apparatus 20 determines whether or not the second captured image P2 is received from the electronic terminal 50 (step ST200). In a case where it is determined that the second captured image P2 is received (step ST200: YES), the collation apparatus 20 acquires the second captured image P2 and the second imaging time point T2 as illustrated in FIG. 9 (step ST201). The collation apparatus 20 acquires the first captured image P1 and the first imaging time point T1 from the database 30 (step ST202).

Next, the elapsed time calculation unit 80 (refer to FIG. 10) calculates the elapsed time from the first imaging time point T1 to the second imaging time point T2 (step ST203). The density correction unit 81, as illustrated in FIG. 14 and FIG. 15, generates the corrected image P1c by performing the density correction on the first captured image P1 based on the elapsed time and on the density change characteristic stored in the density change prediction table 25 (step ST204). The graying processing unit 82 grays the corrected image P1c, and the graying processing unit 83 grays the second captured image P2 (step ST205).

Next, the difference processing unit 84, as illustrated in FIG. 11 and FIG. 16, generates the difference image PS by obtaining a difference between the corrected image P1c and the second captured image P2 (step ST206). The collation region determination unit 85, as illustrated in FIG. 12 and FIG. 16, determines the region other than the stained region 87 as the collation region CA based on the difference image PS (step ST207). The collation unit 86, as illustrated in FIG. 13, acquires each of the first spatial frequency characteristic F1 and the second spatial frequency characteristic F2 from regions corresponding to the collation region CA of the first captured image P1 and to the collation region CA of the second captured image P2 (step ST208).

Next, the collation unit 86 performs collation between the first captured image P1 and the second captured image P2 by calculating the ratio of match between the first spatial frequency characteristic F1 and the second spatial frequency characteristic F2 (step ST209). The collation unit 86 transmits the collation result CR to the electronic terminal 50 (step ST210). The staff of the admission gate can determine whether or not to permit entrance of the participant 13 based on the collation result CR received by the electronic terminal 50.

As described so far, according to the first embodiment, it is possible to improve the collation accuracy of the admission card 40 while using the admission card 40 that is a simple information medium created by printing the collation image 43 on the instant film 41 as a substrate.

While the elapsed time calculation unit 80 calculates the elapsed time from the first imaging time point T1 to the second imaging time point T2 in the first embodiment, a time point at which the first captured image P1 is registered in the database 30 as a storage device may be recorded as a registration time point, and an elapsed time from the registration time point to the second imaging time point T2 may be calculated. In addition, a time point at which the collation image 43 is printed by the printer 18 may be recorded as a printing time point, and an elapsed time from the printing time point to the second imaging time point T2 may be calculated. All of the first imaging time point T1, the registration time point, and the printing time point are an example of a "time point at which a first captured image is acquired" according to the embodiment of the disclosed technology.

Second Embodiment

Next, a second embodiment will be described. In the second embodiment, processing performed by the collation apparatus 20 is different from that in the first embodiment. Hereinafter, the second embodiment will be described mainly based on differences from the first embodiment.

Figure 19:
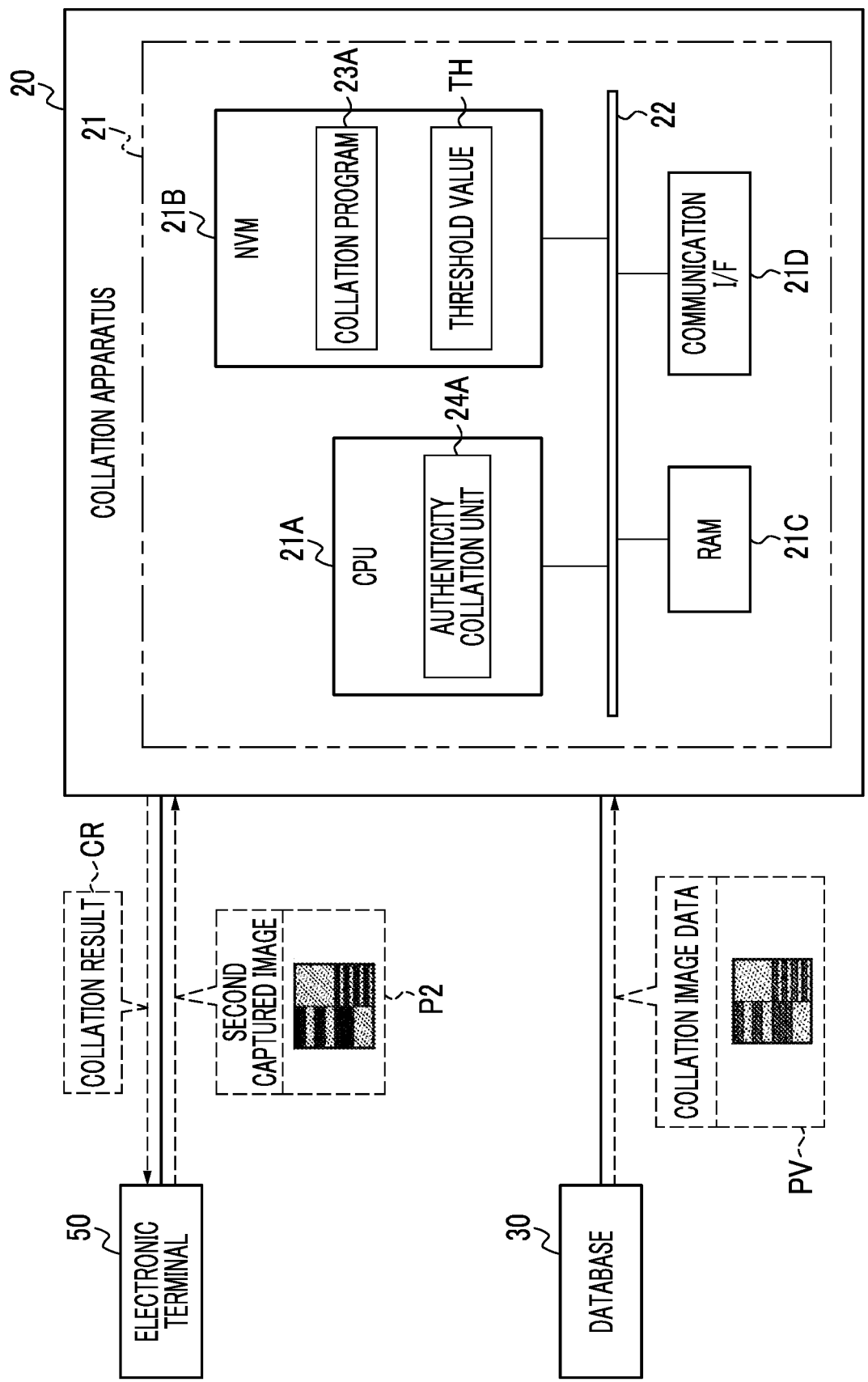
FIG. 19 is a diagram illustrating an example of an internal configuration of a collation apparatus according to a second embodiment.

FIG. 19 illustrates an example of an internal configuration of the collation apparatus 20 according to the second embodiment. In the collation apparatus 20 of the present embodiment, a collation program 23A stored in the NVM 21B is different from the collation program 23 of the first embodiment. That is, an authenticity collation unit 24A that is a function implemented by executing processing via the CPU 21A based on the collation program 23A is different from the authenticity collation unit 24 of the first embodiment.

In the present embodiment, the authenticity collation unit 24A acquires the first captured image P1 from the database 30 and acquires the second captured image P2 from the electronic terminal 50 but is not required to acquire the first imaging time point T1 and the second imaging time point T2. In the present embodiment, the authenticity collation unit 24A further acquires the collation image data PV from the database 30.

Figure 20:
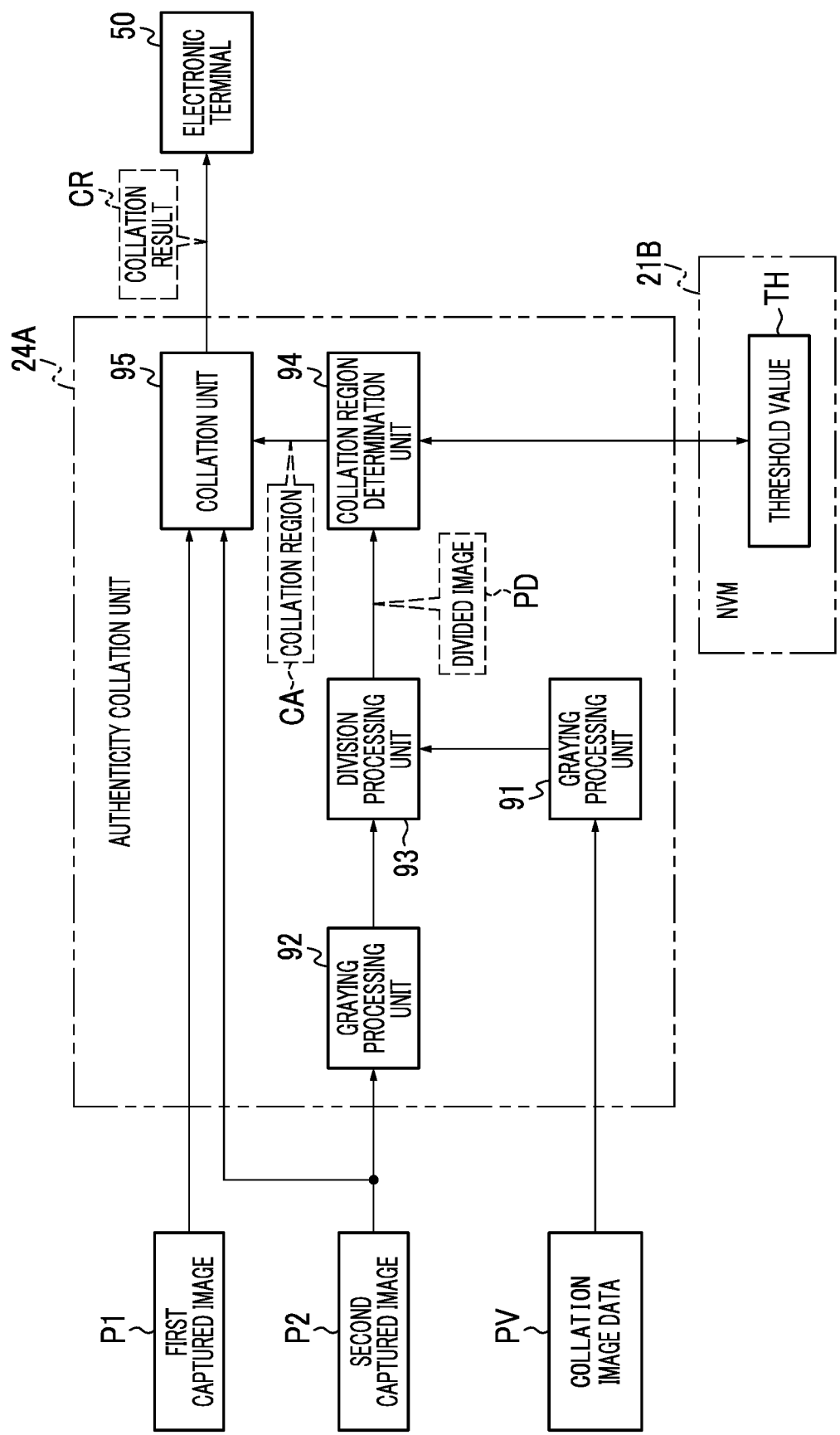
FIG. 20 is a diagram illustrating an example of a functional configuration of an authenticity collation unit according to the second embodiment.

FIG. 20 illustrates an example of a functional configuration of the authenticity collation unit 24A according to the second embodiment. As illustrated in FIG. 20, the authenticity collation unit 24A is composed of graying processing units 91 and 92, a division processing unit 93, a collation region determination unit 94, and a collation unit 95. The graying processing unit 91 performs graying processing of converting the collation image data PV into an achromatic image and inputs the grayed collation image data PV into the division processing unit 93. The graying processing unit 92 performs graying processing of converting the second captured image P2 into an achromatic image and inputs the grayed second captured image P2 into the division processing unit 93.

The division processing unit 93 generates a divided image PD by performing division between the collation image data PV and the second captured image P2 for each pixel. In the present embodiment, for example, the division processing unit 93 generates the divided image PD by dividing pixel values of the collation image data PV by pixel values of the second captured image P2.

The collation region determination unit 94 determines the collation region CA for collation between the first captured image P1 and the second captured image P2 based on the divided image PD. Specifically, by using the threshold value TH stored in the NVM 21B, the collation region determination unit 94 determines a region in which pixel values of the divided image PD are less than or equal to the threshold value TH as the collation region CA.

The collation unit 95 collates the authenticity of the admission card 40 by comparing information (for example, a spatial frequency characteristic) included in the collation region CA determined by the collation region determination unit 94 between the first captured image P1 and the second captured image P2.

Figure 21:
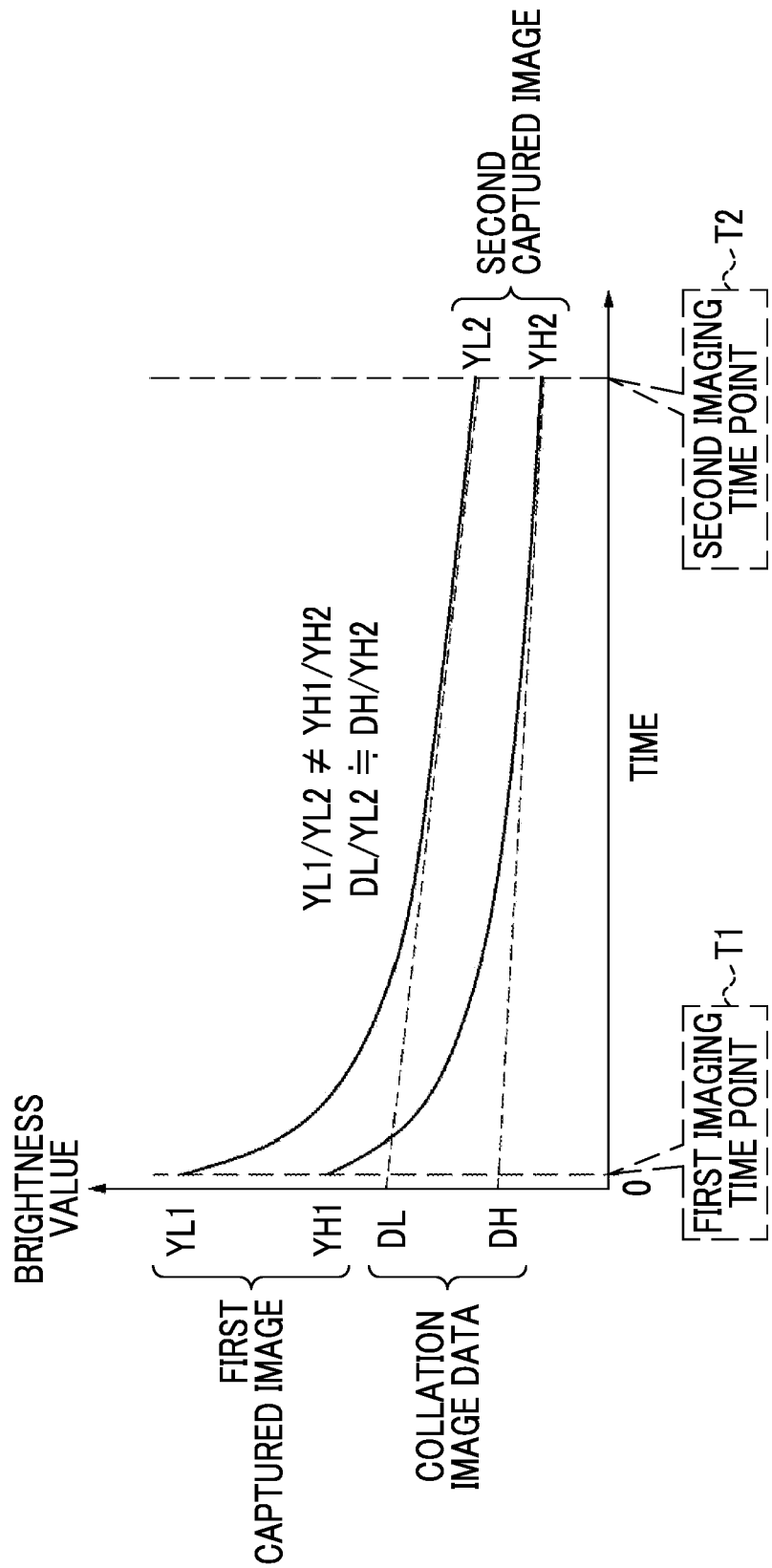
FIG. 21 is a graph for describing a relationship in density among a first captured image, a second captured image, and collation image data.

FIG. 21 describes a relationship in density among the first captured image P1, the second captured image P2, and the collation image data PV. As illustrated in FIG. 21, in the image printed on the instant film 41, the density change is large immediately after printing and gradually changes linearly in accordance with an elapse of time. The density of the image after an elapse of a sufficient time is in a linear relationship with the density of the collation image data PV, not the density of the first captured image P1.

In FIG. 21, YL1 and YH1 represent two different densities (corresponding to brightness values) in the first captured image P1. In addition, YL2 and YH2 represent two different densities in the second captured image P2. Furthermore, DL and DH represent two different densities in the collation image data PV. YL1, YL2, and DL are densities of corresponding identical pixels. YH1, YH2, and DH are densities of corresponding identical pixels.

The density of the second captured image P2 after an elapse of a sufficient time from printing is not in a linear relationship with the density of the first captured image P1. Thus, YL1/YL2≠YH1/YH2 is established. On the other hand, the density of the second captured image P2 is in a linear relationship with the density of the collation image data PV. Thus, a relationship of DL/YL2≈DH/YH2 is established. Accordingly, the divided image PD in which a difference in density is decreased (that is, contrast is decreased) is generated by performing division between the collation image data PV and the second captured image P2.

Figure 22:
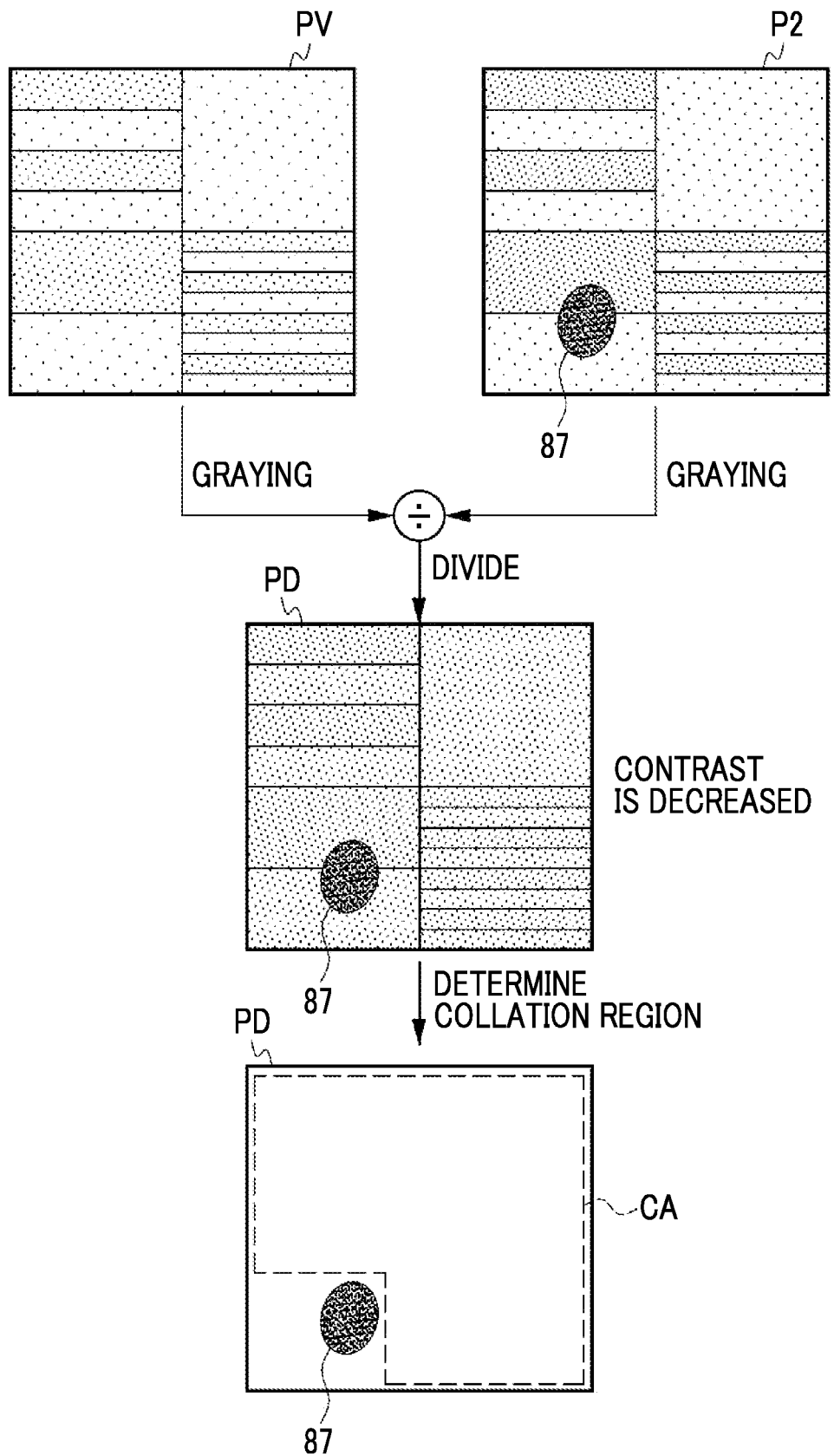
FIG. 22 is a diagram schematically illustrating an example of division processing and of collation region determination processing.

FIG. 22 schematically illustrates an example of division processing and of collation region determination processing. As illustrated in FIG. 22, the divided image PD in which the contrast of the region other than the stained region 87 is decreased is generated by performing division between the collation image data PV and the second captured image P2 via the division processing unit 93. Accordingly, by decreasing the contrast of other than the stained region 87, the collation region determination unit 85 can detect the stained region 87 and determine the collation region CA with high accuracy.

Figure 23:
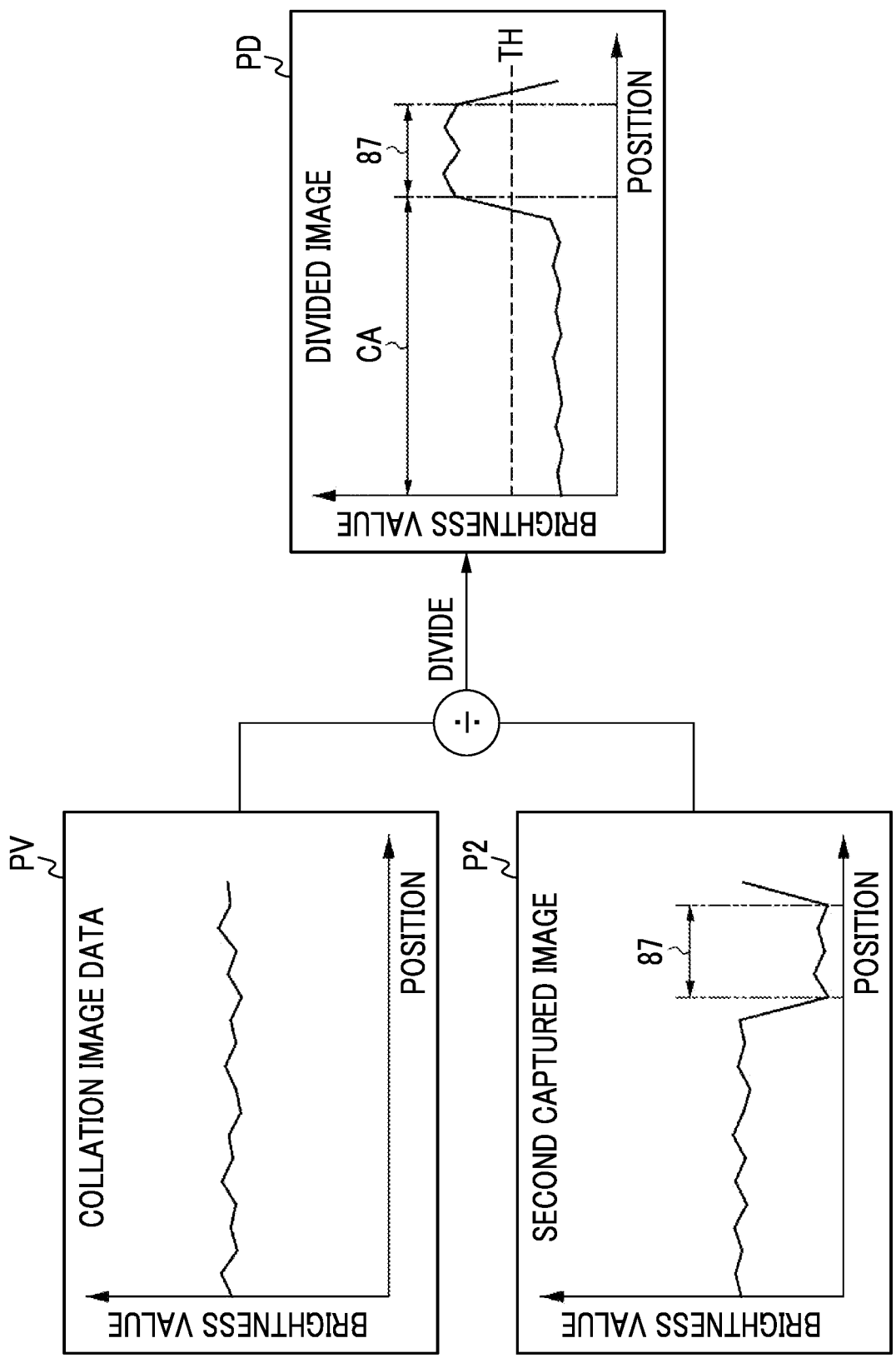
FIG. 23 is a diagram for describing an example of the division processing and of the collation region determination processing in detail.

FIG. 23 describes an example of the division processing and of the collation region determination processing in detail. As illustrated in FIG. 23, the division processing unit 93 generates the divided image PD by dividing one of the collation image data PV and the second captured image P2 by the other. Among the pixel values of the divided image PD, the pixel values of other than the stained region 87 have almost constant values.

The collation region determination unit 94 compares the pixel values of the divided image PD with the threshold value TH and determines at least a part of the region of the pixel values less than or equal to the threshold value TH as the collation region CA. For example, the threshold value TH is a value determined based on an average value of the pixel values of the divided image PD.

Next, actions of the above configuration will be described with reference to the flowchart illustrated in FIG. 24. Issuing processing performed by the issuing apparatus 10 is the same as that in the first embodiment and thus, will not be described. In the second embodiment, calculation of the elapsed time is not required. Thus, it is not required to register the first imaging time point T1 in the database 30. In addition, in the second embodiment, at least the second captured image P2 may be acquired from the electronic terminal 50, and it is not required to acquire the second imaging time point T2.

Figure 24:
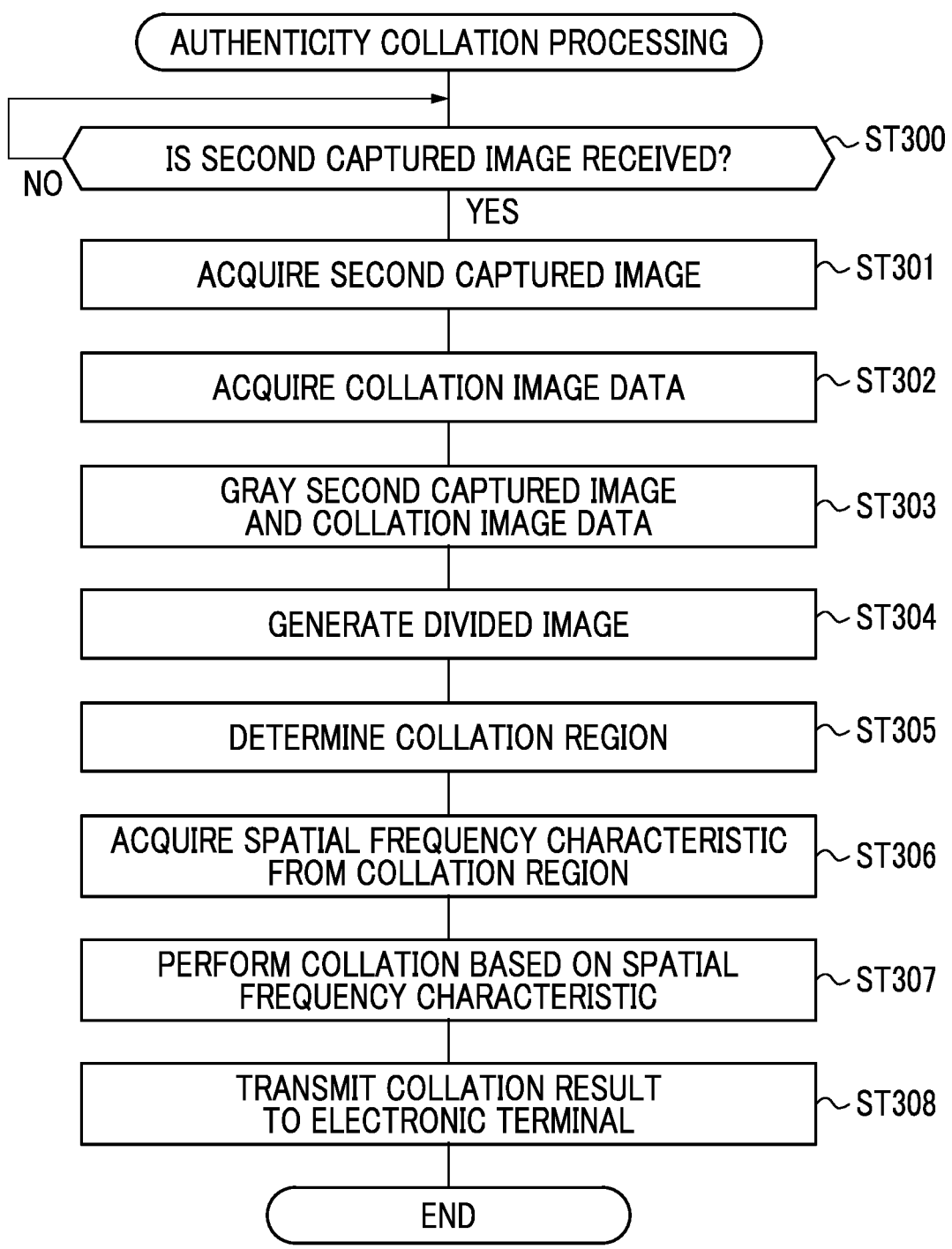
FIG. 24 is a flowchart illustrating an example of a flow of collation processing according to the second embodiment.

FIG. 24 illustrates an example of a flow of collation processing according to the second embodiment. As illustrated in FIG. 24, the collation apparatus 20 determines whether or not the second captured image P2 is received from the electronic terminal 50 (step ST300). In a case where it is determined that the second captured image P2 is received (step ST300: YES), the collation apparatus 20 acquires the second captured image P2 as illustrated in FIG. 19 (step ST301). The collation apparatus 20 acquires the collation image data PV from the database 30 (step ST302).

Next, the graying processing unit 91 grays the collation image data PV, and the graying processing unit 92 grays the second captured image P2 (step ST303). The division processing unit 93, as illustrated in FIG. 22 and FIG. 23, generates the divided image PD by performing division between the collation image data PV and the second captured image P2 (step ST304). The collation region determination unit 94 determines the region other than the stained region 87 as the collation region CA based on the divided image PD (step ST305). Subsequent steps ST306 to ST308 are the same as steps ST208 to ST210 illustrated in FIG. 18.

As described so far, according to the second embodiment, it is possible to improve the collation accuracy of the admission card 40 while using the admission card 40 that is a simple information medium created by printing the collation image 43 on the instant film 41 as a substrate. In addition, in the second embodiment, the collation region CA can be determined without using the first imaging time point T1 and the second imaging time point T2.

Figure 25:
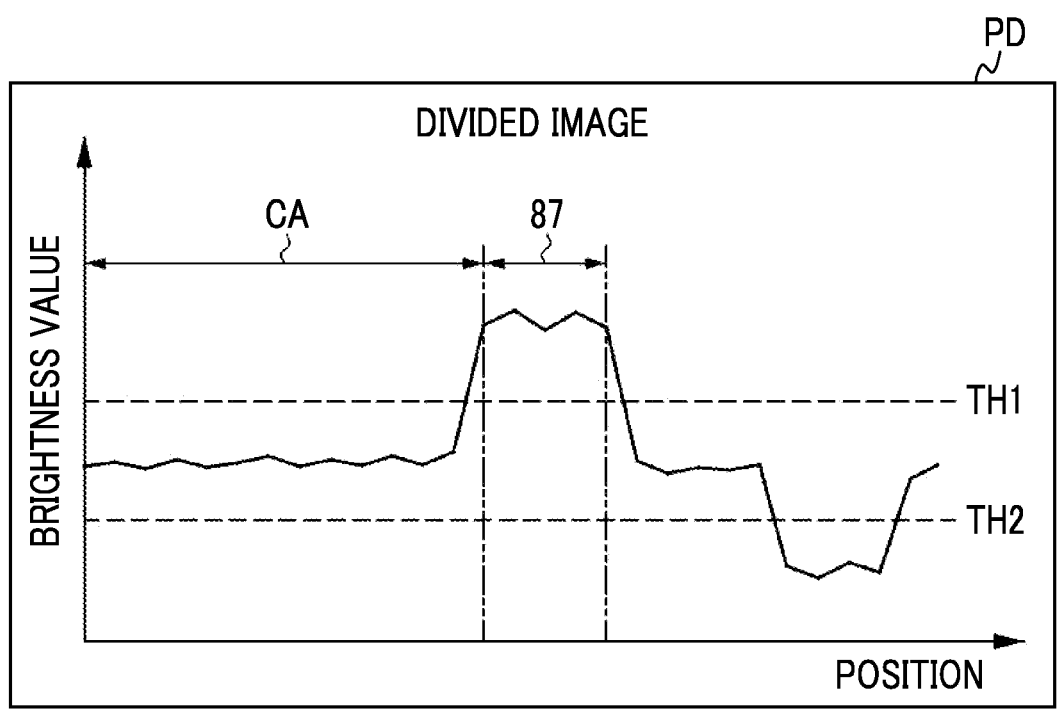
FIG. 25 is a graph for describing a modification example of the collation region determination processing.

While the collation region determination unit 94 determines the collation region CA using one threshold value TH in the second embodiment as illustrated in FIG. 23, the collation region CA may be determined using two threshold values of a first threshold value TH1 and a second threshold value TH2 as illustrated in FIG. 25. For example, the first threshold value TH1 and the second threshold value TH2 are values determined based on the average value of the pixel values of the divided image PD. One of the first threshold value TH1 and the second threshold value TH2 may be set to a value higher than the average value, and the other may be set to a value lower than the average value. Accordingly, by using two threshold values, it is possible to detect the stained region 87 and accurately determine the collation region CA in any of a case where the density of the stained region 87 is higher than the average value and a case where the density of the stained region 87 is lower than the average value.

In addition, while the division processing unit 93 generates the divided image PD by performing division between the collation image data PV and the second captured image P2 in the second embodiment, the divided image PD may be generated by performing division between the first captured image P1 and the second captured image P2. Even in this case, it is possible to detect the stained region 87 and determine the collation region CA by appropriately setting a threshold value.

Modification Example

Hereinafter, various modification examples related to the first and second embodiments will be described.

Figure 26:
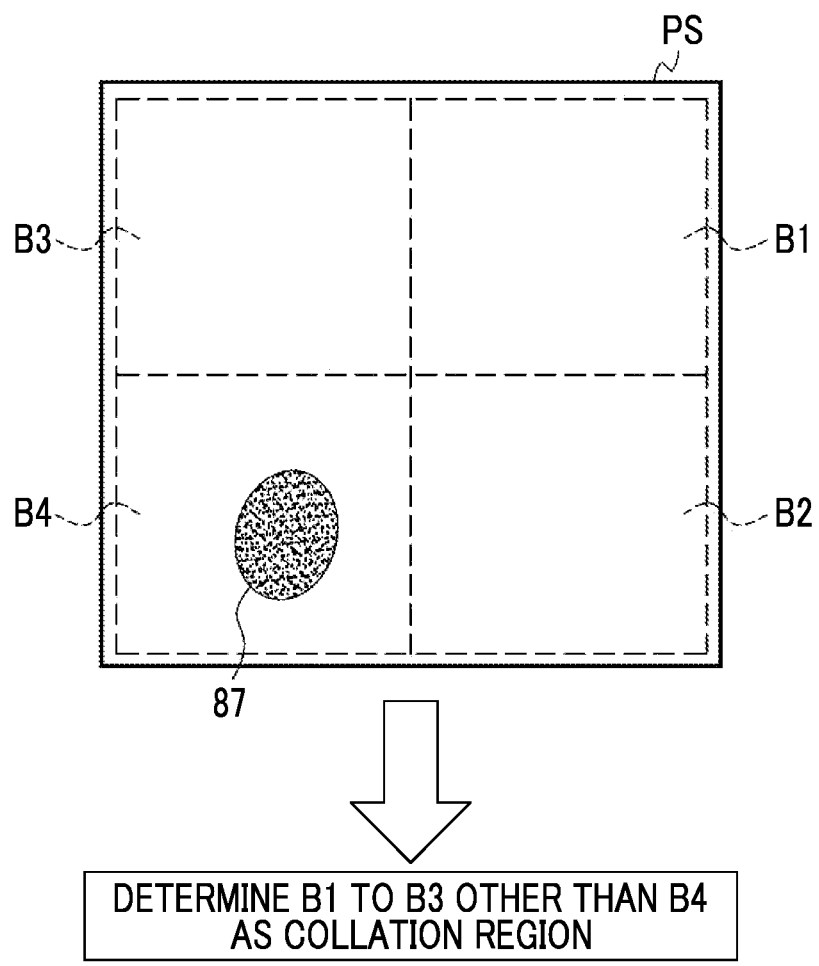
FIG. 26 is a diagram for describing a modification example of the collation region determination processing.

In the first embodiment, as illustrated in FIG. 12, the collation region determination unit 85 determines the collation region CA such that the stained region 87 is excluded in the difference image PS. Thus, the collation region CA determined by the collation region determination unit 85 has various shapes and sizes. Alternatively, as illustrated in FIG. 26, the collation region determination unit 85 may divide the difference image PS into a plurality of blocks and determine one or more blocks not including the stained region 87 as the collation region CA. In the example illustrated in FIG. 26, the difference image PS is divided into four blocks B1 to B4. Since the stained region 87 is included in the block B4, the collation region determination unit 85 determines the blocks B1 to B3 other than the block B4 as the collation region CA. The same applies to the collation region determination unit of the second embodiment.

Figure 27:
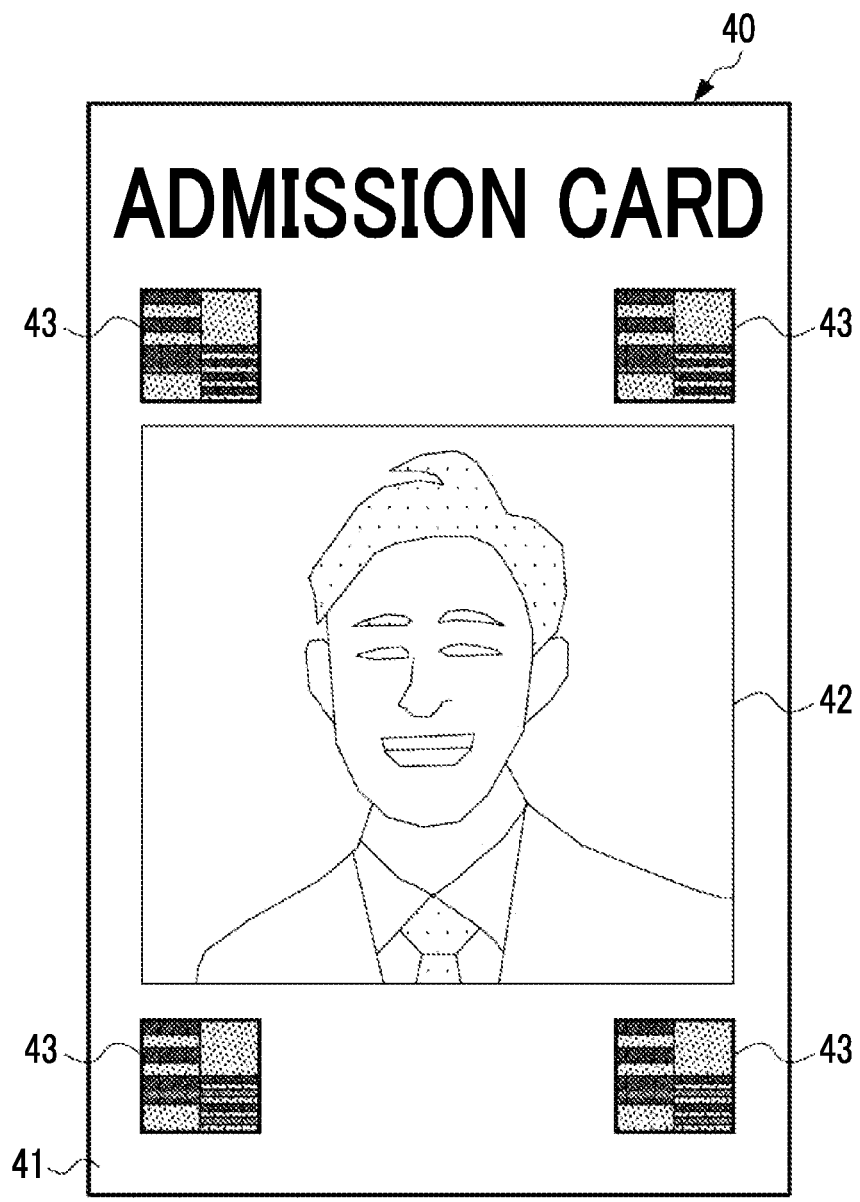
FIG. 27 is a diagram illustrating an example of an admission card on which a plurality of collation images are printed.

In addition, in the first embodiment, as illustrated in FIG. 4, the issuing apparatus 10 prints only one collation image 43 on the admission card 40. Alternatively, the issuing apparatus 10 may print a plurality of collation images 43 on the admission card 40 as illustrated in FIG. 27. In the example illustrated in FIG. 27, four collation images 43 are printed around the face image 42 on the admission card 40. In this case, the collation apparatus 20 may detect the stained region 87 based on the difference image PS for each of the collation images 43 and determine the collation image 43 not including the stained region 87 as the collation region CA. The same applies to the second embodiment.

In addition, while the collation image 43 is a pattern image having a plurality of regions of different densities in the first and second embodiments, the collation image 43 is not limited thereto and may be any image such as an image having a geometric pattern or an image having a microtext.

Figure 28:
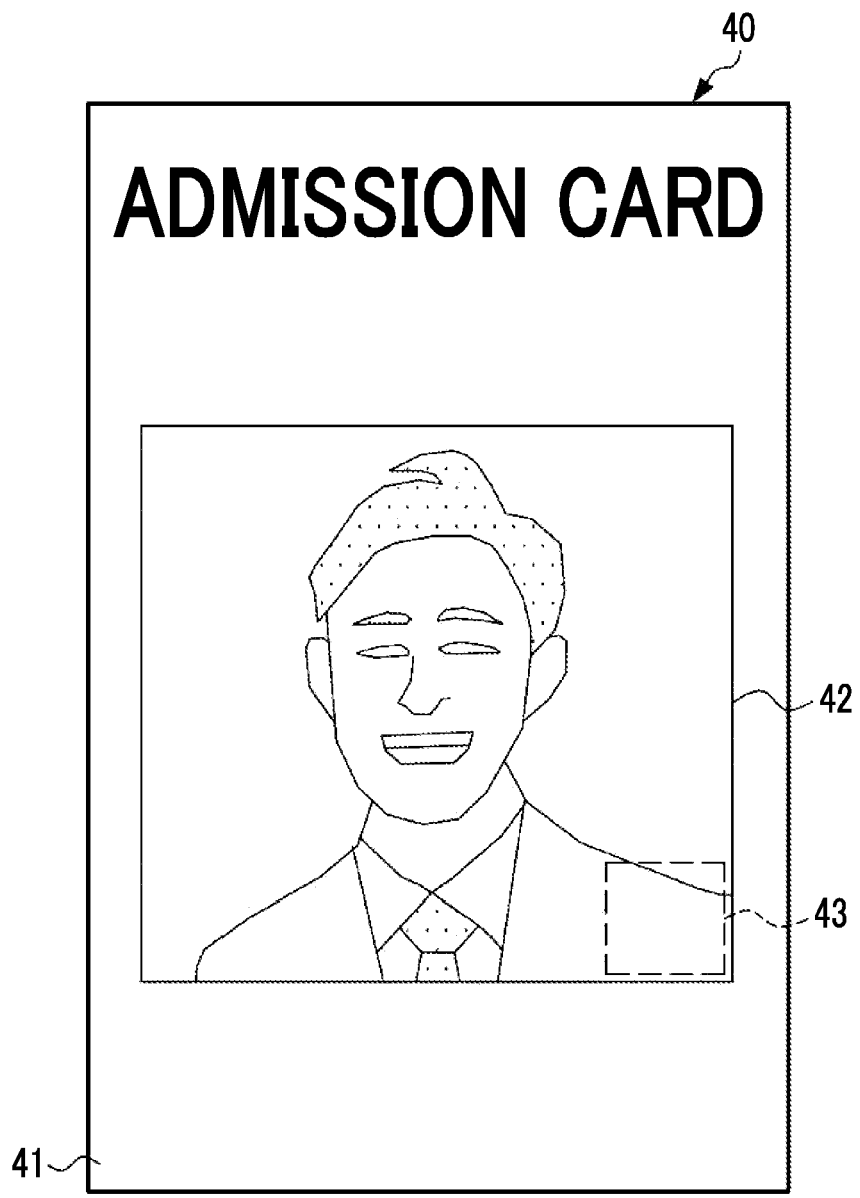
FIG. 28 is a diagram illustrating an example of using a part of a face image as a collation image.

For example, as illustrated in FIG. 28, a part of the face image 42 can be used as the collation image 43.

Furthermore, the collation image 43 may be a solid (that is, single-color) image. Even in a case where the collation image 43 is a solid image, unique density unevenness occurs for each printing on the instant film 41. Thus, collation between the first captured image P1 and the second captured image P2 can be performed based on the density unevenness.

In addition, while the collation image data PV is color image data in the first and second embodiments, the collation image data PV may be achromatic image data. In this case, the graying processing units 82, 83, 91, and 92 are not required.

In addition, in the first and second embodiments, the authenticity of the admission card 40 is collated by comparing the spatial frequency characteristic as information included in the collation region CA between the first captured image P1 and the second captured image P2. Information used for collation is not limited to the spatial frequency characteristic and may be a pattern, a text, or the like included in the image.

In addition, while the printer 18 is an instant photo printer using the instant film 41 as a substrate in the first and second embodiments, the printer 18 is not limited to the instant photo printer. For example, the printer 18 may be a sublimation-type printer of a sublimation-type thermal transfer method. In addition, the sublimation-type printer can use a card made of plastic as a substrate instead of dedicated coated paper. In a case where the sublimation-type printer is used, the admission card 40 may be created by printing the collation image 43 on the card made of plastic. In addition, an ink jet printer of an ink jet method can be used as the printer 18. Density characteristics of images printed on a substrate are different depending on a printing method. Thus, even in a case where a different printer is used, the authenticity of the admission card 40 forged using a printer of a different printing method can be collated.

In addition, while the information medium is used as the admission card 40 for entrance of the participant 13 to the event venue in the first and second embodiments, the information medium is not limited to the admission card 40. The information medium according to the embodiment of the disclosed technology can also be applied to an ID card issued to a worker who performs short-term work. An ID card used by a worker who works at a construction site or the like is held in a hand stained with oil or with dirt during work. Thus, the collation image 43 is easily stained. Accordingly, the disclosed technology is suitably used for collation of the ID card at the construction site or the like.

In addition, while the face image 42 is printed on the admission card 40 in the first and second embodiments, it is not necessary to print the face image 42. That is, the information medium according to the embodiment of the disclosed technology can also be applied to an information medium such as a ticket of which an owner is not required to be authenticated. For example, the information medium according to the embodiment of the disclosed technology can also be applied to an admission ticket, a gift card, a gift certificate, or a coupon for which preventing forgery is important.

In the first and second embodiments, for example, the following various processors can be used as a hardware structure of a processing unit that executes various types of processing of the first imaging control unit 62, the second imaging control unit 63, and the printing control unit 64 of the issuing apparatus 10 and the authenticity collation units 24 and 24A of the collation apparatus 20. Examples of the various processors include, in addition to the CPUs 15A and 21A that are general-purpose processors functioning as various processing units by executing software, a programmable logic device (PLD) such as a field programmable gate array (FPGA) that is a processor of which a circuit configuration can be changed after manufacture, and/or a dedicated electric circuit such as an application specific integrated circuit (ASIC) that is a processor having a circuit configuration dedicatedly designed to execute specific processing. A graphics processing unit (GPU) may be used instead of the FPGA.

One processing unit may be composed of one of the various processors or may be composed of a combination of two or more processors of the same type or of different types (for example, a combination of a plurality of FPGAs and/or a combination of a CPU and an FPGA or a combination of a CPU and a GPU). In addition, a plurality of processing units may be composed of one processor.

A first example of a plurality of processing units composed of one processor is, as represented by computers such as a client and a server, a form of one processor composed of a combination of one or more CPUs and software, in which the processor functions as a plurality of processing units. A second example is, as represented by a system on chip (SoC) and the like, a form of using a processor that implements functions of the entire system including a plurality of processing units in one integrated circuit (IC) chip. Accordingly, various processing units are configured using one or more of the various processors as a hardware structure.

Furthermore, more specifically, an electric circuit (circuitry) in which circuit elements such as semiconductor elements are combined can be used as the hardware structure of the various processors.

Various embodiments and/or various modification examples described above can be appropriately combined in the disclosed technology. In addition, the disclosed technology is not limited to the embodiments and may, of course, employ various configurations without departing from the concept thereof. Furthermore, the disclosed technology also applies to a program and a storage medium that stores the program in a non-transitory manner.

Above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and in the illustrated contents without departing from the gist of the disclosed technology. In addition, particularly, description related to common technical knowledge or the like that does not need to be described in terms of embodying the disclosed technology is omitted in the above described contents and in the illustrated contents in order to avoid complication and to facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. An authenticity collation system comprising:
an issuing apparatus that issues an information medium by printing a collation image on a substrate based on collation image data; and
a collation apparatus that collates authenticity of the information medium based on the collation image,
wherein the issuing apparatus includes a first processor,
the first processor is configured to acquire an image obtained by capturing the collation image printed on the information medium via a camera as a first captured image,
the collation apparatus includes a second processor, and
the second processor is configured to:
acquire an image obtained by capturing a collation image printed on an information medium to be collated via a camera as a second captured image;
generate a corrected image obtained by performing density correction on the first captured image, by predicting a density change at a time point at which the second captured image is acquired based on an elapsed time from a time point at which the first captured image is acquired; and
determine a collation region for collation between the first captured image and the second captured image based on a difference image obtained by obtaining a difference between the second captured image and the corrected image for each pixel.

2. The authenticity collation system according to claim 1, wherein the first processor is configured to register the first captured image in a storage device, and the second processor is configured to acquire the first captured image registered in the storage device, and
the second processor is configured to perform the density correction based on an elapsed time from a time point at which the first captured image is registered in the storage device.

3. The authenticity collation system according to claim 1, wherein the second processor is configured to determine a region in which an absolute value of a pixel value of the difference image is less than or equal to a threshold value as the collation region.

4. The authenticity collation system according to claim 1, wherein the second processor is configured to perform the density correction based on a table representing a relationship between the elapsed time and the density change.

5. The authenticity collation system according to claim 1, wherein the second processor is configured to collate the authenticity of the information medium by comparing information included in the collation region between the first captured image and the second captured image.

6. The authenticity collation system according to claim 5, wherein the information is a spatial frequency characteristic.

7. An authenticity collation method using an issuing apparatus that issues an information medium by printing a collation image on a substrate based on collation image data, and a collation apparatus that collates authenticity of the information medium based on the collation image, the authenticity collation method comprising:
causing the issuing apparatus to execute a first captured image acquisition step of acquiring an image obtained by capturing the collation image printed on the information medium via a camera as a first captured image; and
causing the collation apparatus to execute:
a second captured image acquisition step of acquiring an image obtained by capturing a collation image printed on an information medium to be collated via a camera as a second captured image;
a density correction step of generating a corrected image obtained by performing density correction on the first captured image, by predicting a density change at a time point at which the second captured image is acquired based on an elapsed time from a time point at which the first captured image is acquired; and
a collation region determination step of determining a collation region for collation between the first captured image and the second captured image based on a difference image obtained by obtaining a difference between the second captured image and the corrected image for each pixel.

8. An authenticity collation system comprising:
an issuing apparatus that issues an information medium by printing a collation image on a substrate based on collation image data; and
a collation apparatus that collates authenticity of the information medium based on the collation image,
wherein the issuing apparatus includes a first processor,
the first processor is configured to acquire an image obtained by capturing the collation image printed on the information medium via a camera as a first captured image,
the collation apparatus includes a second processor, and
the second processor is configured to:
acquire an image obtained by capturing a collation image printed on an information medium to be collated via a camera as a second captured image;
generate a divided image by either dividing pixel values of pixels in the first captured image by pixel values of pixels in the second captured image or dividing the pixel values of the pixels in the second captured image by the pixel values of the pixels in the first captured image; and
determine a collation region for collation between the first captured image and the second captured image based on the divided image.

9. The authenticity collation system according to claim 8, wherein the second processor is configured to determine a region in which a pixel value of the divided image is less than or equal to a threshold value as the collation region.

10. The authenticity collation system according to claim 8, wherein the second processor is configured to collate the authenticity of the information medium by comparing information included in the collation region between the first captured image and the second captured image.

11. The authenticity collation system according to claim 10, wherein the information is a spatial frequency characteristic.

12. An authenticity collation method using an issuing apparatus that issues an information medium by printing a collation image on a substrate based on collation image data, and a collation apparatus that collates authenticity of the information medium based on the collation image, the authenticity collation method comprising:

causing the issuing apparatus to execute a first captured image acquisition step of acquiring an image obtained by capturing the collation image printed on the information medium via a camera as a first captured image; and causing the collation apparatus to execute:
  a second captured image acquisition step of acquiring an image obtained by capturing a collation image printed on an information medium to be collated via a camera as a second captured image;
  a divided image generation step of generating a divided image by either dividing pixel values of pixels in the first captured image by pixel values of pixels in the second captured image or dividing the pixel values of the pixels in the second captured image by the pixel values of the pixels in the first captured image; and
  a collation region determination step of determining a collation region for collation between the first captured image and the second captured image based on the divided image.

* * * * *